United States Patent [19]

Massa et al.

[11] Patent Number: 4,589,081

[45] Date of Patent: May 13, 1986

[54] INTELLIGENT SURVEILLANCE ALARM SYSTEM AND METHOD

[75] Inventors: Ronald J. Massa, Bedford; Theodore R. Ellis, Rockport; Robert G. LePage, Littleton, all of Mass.

[73] Assignee: Dynatrend, Incorporated, Woburn, Mass.

[21] Appl. No.: 475,445

[22] Filed: Mar. 15, 1983

[51] Int. Cl.[4] ............................................ B60Q 1/54

[52] U.S. Cl. .................................... 364/554; 340/540; 340/501

[58] Field of Search ....................... 364/554, 550, 415; 340/540, 541, 825.31, 825.32, 825.33, 501

[56] References Cited

U.S. PATENT DOCUMENTS

| | | | |
|---|---|---|---|
| 3,668,703 | 6/1972 | Klein | 340/554 X |
| 4,001,785 | 1/1977 | Miyazaki et al. | 364/554 X |
| 4,124,840 | 11/1978 | Kobayashi | 364/550 X |
| 4,197,854 | 4/1980 | Kasa | 364/415 X |
| 4,216,462 | 8/1980 | McGrath et al. | 364/415 |
| 4,356,475 | 10/1982 | Neumann et al. | 364/415 X |
| 4,460,892 | 7/1984 | Bailey, Jr. | 364/550 X |
| 4,507,735 | 3/1985 | Moorehead et al. | 364/442 |

OTHER PUBLICATIONS

Microprocessor Based Data Acquisition System; V. V. Athani, Microprocessors & Microsystems, vol. 3, No. 8, Oct. '79, pp. 359-364.

A Computer Based System for Data Acquisition and Control of Scientific Experiments on Remote Platforms, K. N. Birch et al, Oceans '76, Washington, D.C., USA; Sep. 13-15, 1976.

*Primary Examiner*—Edward J. Wise

*Attorney, Agent, or Firm*—Joseph S. Iandiorio; William E. Noonan

[57] ABSTRACT

An anomaly detection system (10) and method including; a plurality of sensor means (12) for providing an output representative of the current operational environment of the subject premises. There are means (14), responsive to the output, for translating the output to a signal, and control means (18) for statistically defining the normal operational parameters of the subject premises.

Stochastic means (16), responsive to the output representatives of the current operational environment periodically adjust the definition of the normal operational parameters of the subject premises. There are processor means (20) for comparing the output representative of the current operational environment with the updated definition of the normal operational parameters of the subject premises, and for detecting a deviation therebetween. Output means (22), responsive to the means for comparing and detecting, provide an output representative of the detected deviation between the output representative of the current operational environment and the normal operation parameters of the subject premises. A plurality of response devices (24), responsive to the output means for providing a specific response sequence representative of the nature and location of the detected deviation.

37 Claims, 40 Drawing Figures

*TEMPORARY RECORD (SEE FIG. 18A)

INTELLIGENT SURVEILLANCE ALARM SYSTEM AND METHOD

FIELD OF INVENTION

This invention relates to a computer-controlled anomaly detection system and method which includes a plurality of inversely related modes of detection. More particularly, the invention relates to such an anomaly detection system and method in which the functions of monitoring, detection and response, as well as the definition and update of system parameters, are implemented by data entry rather than by hardware logic.

BACKGROUND OF INVENTION

Traditional anomaly detection devices provide a single perimeter line of defense and are not easily adaptable to changed characteristics in the environment of the subject premises to be protected. Initial installations as well as subsequent alterations to system configurations, require extensive custom engineering.

Such systems are usually based on hardware logic and are therefore inherently complex, costly and prone to extensive component maintenance and failure. Component failure can necessitate considerable repair costs and "down time", resulting in an increased risk of undetected loss or damage. These systems are also subject to false and nuisance alarm responses due to component failure or insignificant detected deviations. The failure to detect and respond to an actual anomalous condition can also occur. Intentional attempts to disable or defeat these systems are often successful, and attempts to prevent such tampering are often quite limited in their effectiveness.

Most conventional devices monitor a steady state or combination of steady switch states, in order to detect an anomalous condition. When an anomaly is detected, an output response is initiated. Typically the output is limited to a single or small set of simultaneously initiated responses. The response devices may provide an audible or visual output, such as a horn or flashing light, or may include data communication links.

Once a response is activated, conventional systems are insensitive to alternate, subsequent, or simultaneous disturbances until the system is reset. The fact that many system detection modes are based on sound or movement variations renders such systems ineffective while the premises are occupied during conventional business operations.

SUMMARY OF INVENTION

It is therefore an object of this invention to provide an anomaly detection system which utilizes software logic to implement the definition and detection of disturbances in the operating environment of the subject premises.

It is a further object of this invention to provide such an anomaly detection system in which the detection and response functions are initiated without human intervention.

It is a further object of this invention to provide such an anomaly detection system which monitors the current operating environment of the subject premises and detects an anomalous condition by sensing deviations from the normal operating environment of the subject premises.

It is a further object of this invention to provide such an anomaly detection system which includes several inter-related modes of anomaly detection.

It is a further object of this invention to provide such an anomaly detection system in which each mode of anomaly detection is complementary to each of the other modes of detection, such that attempts to defeat a specific mode of detection will enhance the probability of detection by the alternate modes.

It is a further object of this invention to provide such an anomaly detection system which includes a number of operating modes, each of which can be employed by a specific command, thereby allowing distinct operational characteristics for various types of normal activity conditions.

It is a further object of this invention to provide such an anomaly detection system in which the statistical operating parameters of the system are constantly adjusted to reflect insignificant variations in the operating environment while maintaining sensitivity to statistically significant changes which may be indicative of actual disturbances.

It is a further object of this invention to provide such an anomaly detection system which provides a series of distinct, data-controlled, time-sequenced alarm responses, each of which is indicative of the nature and location of the anomaly.

The invention results from the realization that an improved anomaly detection system and method can be achieved by providing an output representative of the current operational environment and providing a set of detection control parameters representative of the normal operational environment. There are means for comparing the provided output representative of the current operational environment with the set of detection control parameters representative of the normal operational environment, and detecting any deviation therebetween. There are also means responsive to the means for comparing and detecting, for providing an output representative of any detected deviation between the current operational environment and the set of detection control parameters representative of the normal operational environment.

The set of detection control parameters may be stochastic in nature and may be constantly adjusted to reflect routine variation in the operational environment data received while retaining sensitivity to statistically significant changes which may be indicative of an abnormal situation.

The system includes a plurality of complementary detection methods such that attempts to defeat a particular detection method will increase the probability of detection by an alternate detection method. There are also several detection modes for operation during environmental conditions which are substantially different.

The set of detection control parameters is implemented by software logic. In a preferred embodiment, the set of detection control parameters may be modified manually by data entry, or automatically, in response to changed characteristics in the subject premises to be protected or in the normal operational environment.

The means for comparing and detecting may include a microprocessor. The means for providing an output, representative of the current operational environment, may include sensor means, and the sensor means may be acoustical in nature. The response provided, upon anomaly detection, may be provided without human intervention, and may be indicative of the source, location and nature of the disturbance.

DISCLOSURE OF PREFERRED EMBODIMENT

Other objects, features and advantages will occur from the following disclosure of a preferred embodiment and the accompanying drawings in which.

Figure 1:
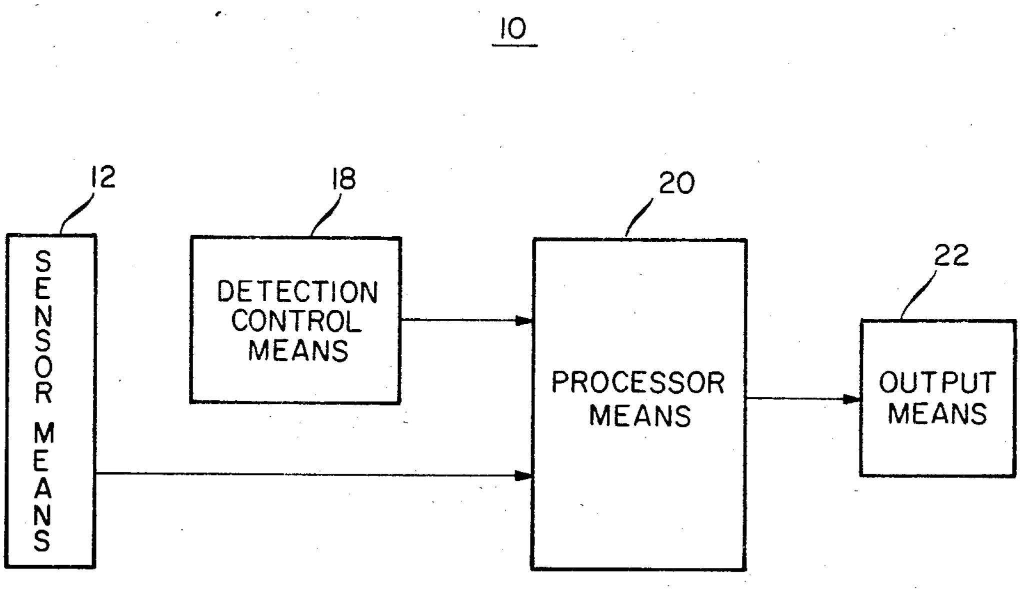
FIG. 1 is simplified block diagram of an anomaly detection system according to this invention.

There is shown in FIG. 1 an anomaly detection system 10 according to this invention in which sensor means 12 delivers an output representative of the current operational environment of the subject premises to processor means 20. Processor means 20 compares that output to a set of detection control parameters delivered by detection control means 18. These detection control parameters define the normal operational environment and the deviations therefrom which would be indicative of a disturbance.

Processor means 20 provides an output representative of any detected deviation between the current sensory output and the detection control parameters, and delivers that data to output means 22, for subsequent processing.

Figure 2:
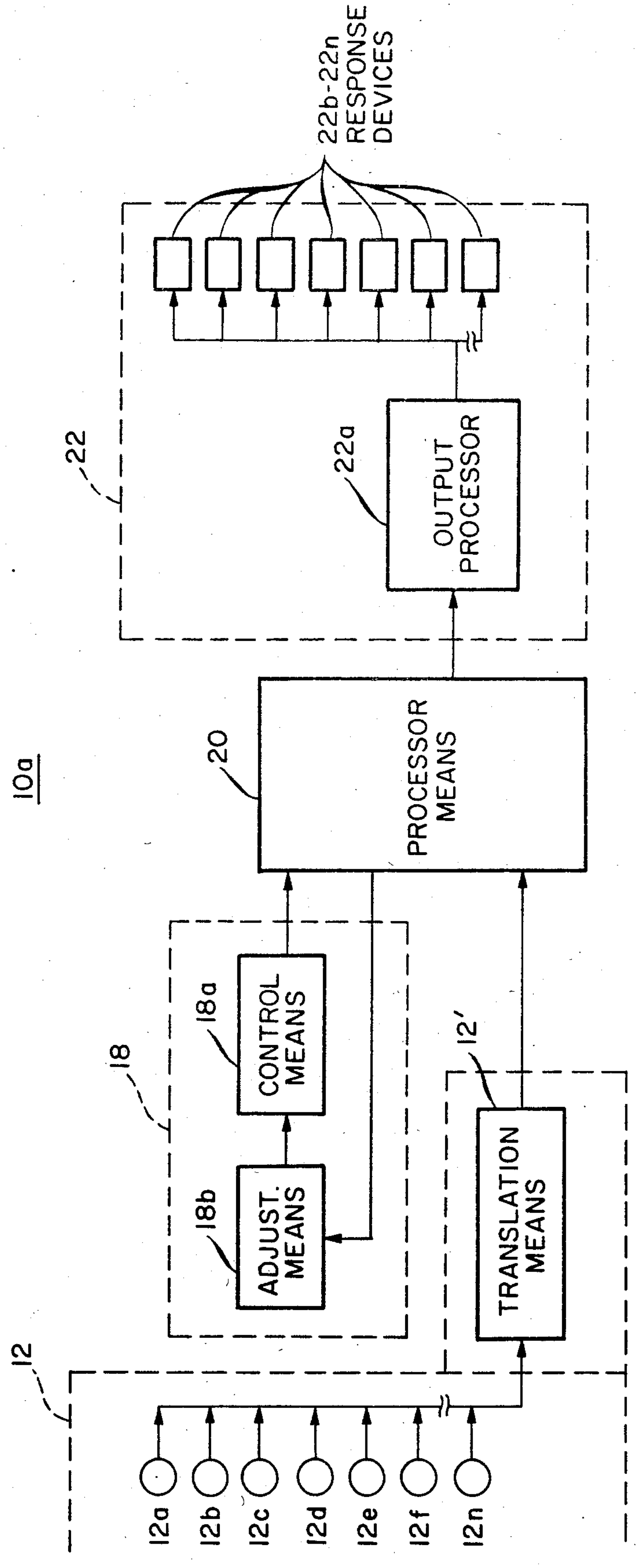
FIG. 2 is a more detailed block diagram of the anomaly detection system shown in FIG. 1.

FIG. 2 is a more detailed block diagram of one embodiment of this invention 10a, in which sensor devices **12*a*–12*n* each deliver a sensory output representative of the current operational environment of the subject premises. This sensory output is converted to a processor signal by translation means 12' and is delivered to processor means 20. Sensor devices 12*a*–12*n* may include acoustical devices, metal detectors, push buttons, entry sensors, or any combination of binary output sensor devices. In this embodiment, processor means 20 may include a microprocessor, such as a Z80 based type, or other similar processor device. Processor means 20 also receives a set of detection control parameters from detection control means 18. This series of detection and control parameters are indicative of the normal operational environment data and the particular deviations that would be indicative of an abnormal condition or disturbance. Detection control means 18 includes control means 18*a* and adjusting means 18*b*, which is responsive to the processing signal from translation means 12'**, and serves to periodically update the detection and control parameters in order to reflect insignificant changes in the routine operational environment while retaining sensitivity to stastically significant changes which may be indicative of a disturbance.

In addition to being periodically updated internally by system recognition of changed conditions, the detection control parameters may be altered manually by data entry. Manually implemented alterations may include enlarging or changing the configuration of the subject premises, or instructing the system to disregard the sensory output of a known defective or inoperative sensor component.

The ability to implement these manual changes may be inherent in the system functions or may entail the use, by a service technician, of a piggy-back type computer, thereby reducing system cost and complexity.

Processor means 20 also identifies the particular sensor or group of sensors which are delivering a deviant output. This is accomplished by identifying the sensor number in the detection control parameters. This output is delivered to output means 22 for subsequent processing. Output means 22 includes an output processor **22*a* and a series of alarm/response devices 22*b*–22*n*, which are activated in a sequential manner which is indicative of the nature and location of the detected disturbance. Alarm/response devices 22*a*–22*n*** may include a variety of items such as acoustical or visual devices or data communication links. An alpha-numeric display device for monitoring by a system operator may be included as one of the output devices.

Figure 3:
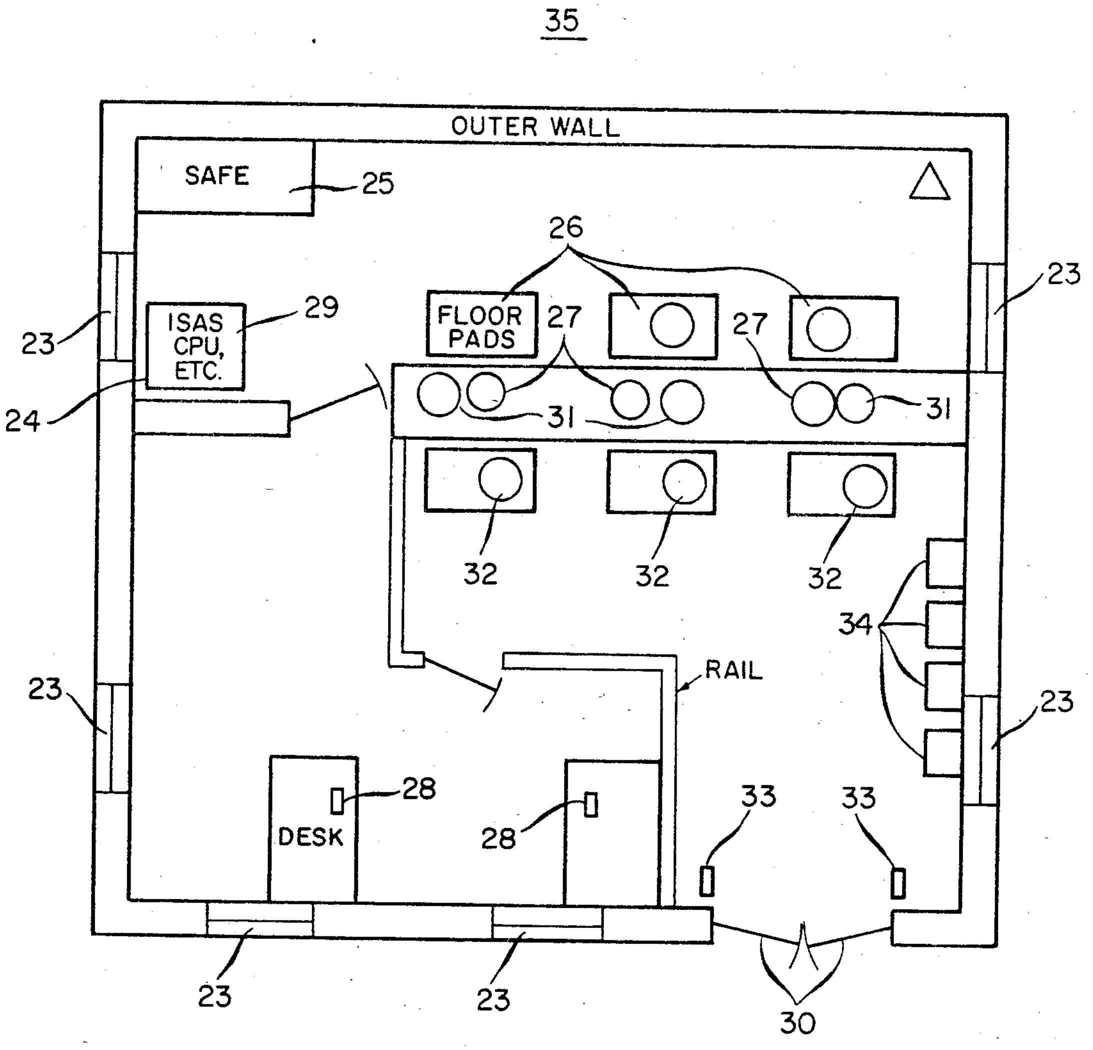
FIG. 3 is a diagrammatic plan view of a typical anomaly detection system installation at a bank location.

A simplified diagram of a bank installation 35 of an anomaly detection system according to this invention is shown in FIG. 3. While any type of binary sensor means may be used in conjunction with the system, the following sensor types are represented in FIG. 3:

23. Window Sensors;.

24. Power Line Monitor;

25. Safe Door Sensor;
26. Teller Station Floor Pad Sensors;
27. Teller's Cash Drawer Sensors;
28. Telephone Activity Sensors;
29. ISAS Case Tamper Sensor;
30. Door Sensors;
31. Teller's Panic Button Sensors;
32. Queue Line Occupancy Sensors;
33. Metal Detector Sensors; and
34. Service Area Seat Sensors.

The anomaly detection system of FIG. 3 has three distinct operating modes, each of which is employed in an attempt to detect different occurrences during different operational environment conditions. For example, the night operating mode might seek to detect any activity indicative of movement as indicative of a disturbance, while the day operating mode might seek to detect a lack of activity, as indicative of a disturbance.

In addition, the anomaly detection system depicted in this embodiment has several distinct detection modes, each of which is complementarily related such that any attempt to defeat or disable a particular mode will enhance the probability of detection by an alternate mode.

The first mode is the combinations mode and includes three categories of detection combinations. The first category is the conjunctive detection combination mode ("and" combinations), and attempts to detect an unlikely combination of events as represented by the simultaneous occurrence of several required sensor states. Each such combination is indicative of a particular disturbance. The conjunctive detection combination mode monitors the subject environmental conditions in an attempt to look for a specific conjunctive combination of events by instructing the system to look for the required sensor state for each of the sensors associated with that particular combination. If a required combination of sensor states, as determined by the particular detection and control parameters is detected, a specific response function will be initiated.

A deviant conjunctive sensor combination might include the following true conditions:

1. Metal detector sensor 33 true, indicating handgun potential, and

2. Panic button sensor 31 true, indicating manually initiated indication of disturbance, and 3. Safe door open sensor 25 true, indicating safe door open, and 4. Power line monitor sensor 24 true, indicating tamper.

This conjuntive combination might be indicative of a disturbance in all three operating modes (day, night and at times when only bank personnel are present, such as during opening and closing operations).

Often is it necessary to seek detection of a non-event or a non-occurrence of an event. In order to do this, the required sensor state necessary to activate the alarm/response is reversed. The system is, therefore, instructed to look for a "false" sensor switch state for the particular sensor which corresponds to the particular non-occurrence sought. For example, the following conjunctive combination of non-occurrences would cause the initiation of an appropriate alarm/response sequence:

1. all service area seat sensors 34 false, indicating no occupancy, and 2. all teller station occupany sensors 26 false, indicating no occupancy, and 3. all queue line sensors 32 false, indicating no occupancy.

This situation might be indicative of a situation where all patrons and employees of the bank were "herded" into a specific area of the bank.

This negative conjunctive combination would only be sought during the day operating mode because these sensor states would not be indicative of a disturbance in the night mode. In order to detect such a disturbance, the detection system is designed to recognize the occurrence of the required false sensor states in all of the above-mentioned sensors simultaneously, thereby making the required combination true (i.e. Sensor 1 not true, and sensor 2 not true and sensor 3 not true).

This ability to test for a non-occurrence provides extensive versatility to combine the required non-occurrence sensor states with required occurrence sensor states in order to test for mixed conjunctive combinations. A specific control parameter therefore might test for a true sensor state of a teller's cash drawer open 27, and a false sensor state of a teller occupancy sensor or pad 26. This would be indicative of a money drawer being open while the teller was not at the drawer.

Certain sensor indications are indicative of a disturbance in one operating mode and not in another. For example, a window open 23, door open 30, or safe open 25 sensor indication may be perfectly acceptable during the normal operating mode and yet indicative of a disturbance in the night operating mode. Thus, it is necessary for each control parameter within each operating mode, to have the ability to test for different sensor combinations and for different required sensor states within those combinations.

In any case, before an alarm response sequence is initiated, the control parameters are designed to test whether any of the sensors have changed sensor states since the preceding sensor polling cycle. An alarm/response sequence will not be initiated unless the required sensor state is satisfied, and a change of sensor state has occurred since the preceding sensor polling cycle. This additional requirement reduces the occurrence of false alarm responses and prevents dispatch of repeated alarm responses. If the above requirements are met (required combination true and change of sensor state from preceding sensor polling cycle), a particular alarm response is initiated. The specific alarm response is dependant on the nature of the disturbance. For example, if the detector combination is indicative of a "herding" situation in a specific area of the bank, the alarm response might include a remote alarm to the police department, and/or the emission of an anesthesizing gas. Each of the alarm responses is specifically tailored in this manner to the nature of the detected abnormal condition.

The second category of combination detection modes is the disjunctive combination detection mode ("or" combinations) which monitors for the occurrence of alternative combinations of event. The detection of a designated deviant disjunctive combination would also activate a particular alarm response. A deviant disjunctive combination includes a required sensor state of a certain sensor in the particular combination or the required sensor state of alternative sensors in the same combination. For example, if any one or more of the teller's panic button sensors 27 are activated, indicating an abnormal condition, an alarm/response sequence will be initiated.

The system is capable of monitoring for negative or mixed disjunctive combinations in the same manner as negative or mixed conjunctive combinations discussed previously. That is to say, the required sensor states for the sensors associated with the particular non-occurrence that is sought, may be inverted such that an alarm response is initiated only if the required false sensor state is present for those particular sensors. For example, the following control parameter may be applicable in the night operating mode: sensors 30 indicate that the doors are open, or sensors 21 indicate that the windows are open, or sensor 23 indicates that the safe is not locked. If this control parameter is satisfied, an alarm/response will be initiated.

The third category of combination modes is the threshold quantity combination mode ("M out of N" combinations). In this combination mode, the system seeks to detect a certain threshold quantity of required sensor states out of a certain available quantity of active sensors within the combination.

The second detection mode is the temporal detection mode, and includes a series of sequential temporal stages during which the system attempts to detect certain conditions, evidenced by particular sensor state, within a specific temporal proximity to other conditions or occurrences. In addition to the required sensor states, it is necessary that the triggering state be different from that of the previous sensor polling routine.

For example, if a cash drawer is opened as indicated by sensor 25 within a certain time proximity to a panic button activation (sensor 29), a dye may be injected onto the cash in that particular drawer.

The stochastic analysis is the third detection mode, and checks for a statistically significant quantity of events occurring in a particular segment of time. The events may be limited to one or more designated zones and the zones may be redefined and reconstructed by data entry. The statistical event count threshold is periodically updated to reflect routine variation in activities while maintaining sensitivity to statistically significant changes in the frequency of events within a particular zone. A surrogate sensor is assigned to the stochastic analysis output, thereby enabling it to be included as an element in one of the other detection combinations. For example, one of the "and" combinations may seek to detect a true metal detector sensor state and a statistically significant change in the activity level in the teller zone. Alternatively, a "temporal" combination may seek to detect a statistically significant flurry of activity within the safe, within several minutes of a true metal detector sensor state.

Figure 4:
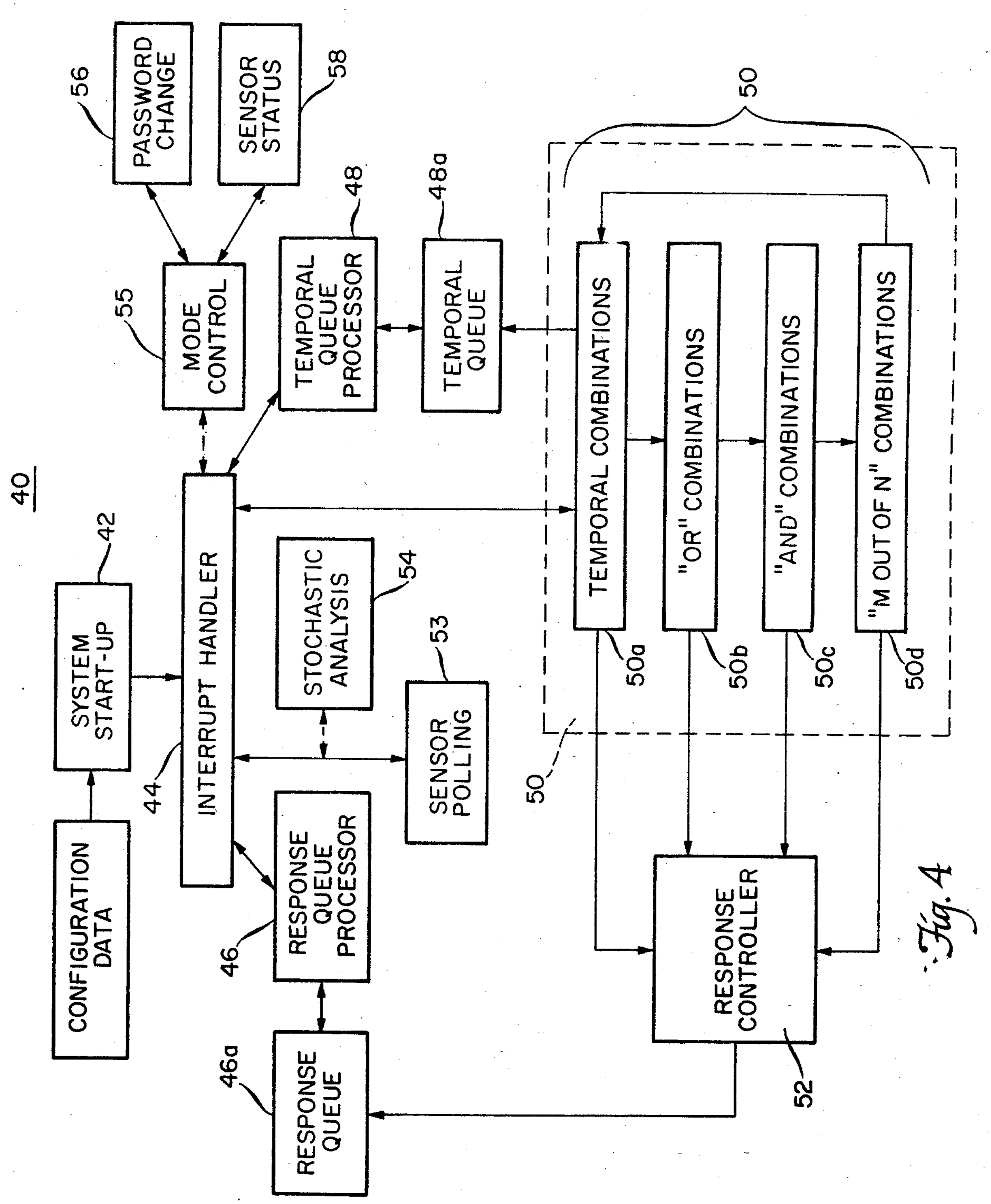
FIG. 4 is a diagrammatic overview of one embodiment of a system that can be utilized to implement the anomaly detection system depicted in FIG. 2.

FIG. 4 is a software system overview 40 of one embodiment of an anomaly detection system according to this invention in which site-specific configuration data is entered during system start-up in step 42. Once this data is entered, interrupt handler 44 processes the overall operation of the system.

In the normal operating mode, the system checks a number of standard functions including the response queue processor 46, the temporal queue processor 48, and detection functions 50*a*–50*d*, while periodically polling the system sensors (step 52) in order to evaluate the current status of the subject environment to be protected. The sensor polling period is determined during the initial set-up of the system. The current state of each sensor is tested at each polling cycle.

The stochastic analysis (step 54) is also periodically performed. This analysis however, occurs less frequently. For example, the stochastic analysis may occur after each fifth sensor polling cycle.

The response queue processor 46 and temporal queue processor 48 are checked after each polling cycle, to determine whether it is necessary to process any pending actions. The response queue processor 46 is activated upon appropriate designation by response queue 46*a*, that there are response actions that must be performed. The temporal queue processor 48 is activated upon appropriate designation by temporal queue 48*a* that a time-out interval has elapsed. The response processor 46*a*, once activated, has absolute priority over the remaining functions of the system. After appropriate alarm/response dispatch occurs, the interrupt handler will return the system to a detection mode.

When interrupt handler 44 accesses temporal queue processor 48, processor 48 looks at the temporal queue 48*a* to see if any pending temporal combinations have reached their time limits and re-cycling should be implemented. If temporal queue 48*a* does not contain an indication of such pending action, the system resumes operation of the detection parameters.

If however, temporal queue 48*a* contains indications that the required waiting time has elapsed, the response action to be implemented as a consequence of that time-out will be placed on the response queue by the response controller 52, for subsequent implementation by the response queue processor 46. The re-cycling of the temporal combination is also implemented at that point.

The detection function cycle 50 (including modes 50*a*–50*d*), continuously polls 53 the system sensors in order to detect anomalous conditions. The detection function cycle contains several detection control parameters including temporal combinations, conjunctive combinations, disjunctive combinations and threshold quantity combinations ("M out of N"). Each of these detection control parameters are tested repeatedly in an effort to detect an anomalous condition. When such a condition is detected as indicated by the occurrence of the required sensor states necessary to satisfy a particular combination, an output is delivered to response controller 52 which will provide an acknowledgement of the detected anomaly, and the designated time and type of response to be dispatched or performed. This data will be placed on response queue 46*a*. Response processor 46 will be activated upon recognition of the detection acknowledgement on response queue 46, in order to process the appropriate alarm/response sequence for the detected anomaly.

The temporal combination function tests for a certain combination of required sensor state conditions within a specified temporal proximity of each other. For example, the temporal combination detection mode might test for a cash drawer open sensor 27, FIG. 3, within minutes of a panic button sensor 31, FIG. 3, activation.

The disjunctive combination ("or" combinations) selection mode tests for one or more required sensor states within a certain specified group indicative of the occurrence of at least one of a number of possible conditions or occurrences. For example, the disjunctive combination detection mode might test for the activation of any one or more panic buttons out of eight such available buttons.

The conjunctive combination ("and" combinations) detection mode tests for a combination of two or more required sensor states indicative of the occurrence of two or more conditions. For example, the conjunctive combination detection mode might test for a teller drawer open sensor 27, FIG. 3, and teller station unoccupied sensor 26, FIG. 3, indication.

The threshold quantity combination ("M out of N" combinations) detection mode tests for the occurrence of a certain number of required sensor states out of a specified number of available sensors. For example, the threshold quantity combination might test the vacancy of at least 6 out of 8 available teller stations as indicated by six sensor states 26, 27, 31, 32, FIG. 3. This condition might be indicative of a "herding" situation where the tellers have been instructed, under duress, to leave their stations.

If any of the required combination of sensor states is detected, an ouput is delivered to response controller 52, FIG. 4, which places an indication of the detected anomaly on response queue 46a. Upon recognition of the indication, response queue processor 46 is activated to initiate the appropriate alarm/response sequence for the detected anomaly.

The series of detection modes continues until such time as they are interrupted, either by keyboard command or by a scheduled sensor polling routine.

The mode control function 55 is keyboard accessed by a operator. Upon recognition of a particular keyboard command, the system may be placed into a "standby" status, by interrupt handler 44, during which the user performs the desired mode control activities. These activities include password changes and sensor status changes.

The password change capability 56 is included to update or vary the system accessability to provide an added degree of security The sensor state change capability 58 is provided to allow an operator to disable a sensor that is known to be inoperative or to re-enable a sensor that has been repaired since being disabled. Inherent in the sensor status change function is a testing procedure to insure that the elimination of a particular sensor will not degrade the detection capabilities of a particular detection control parameter beyond its point of usefullness.

Upon completion of the desired mode control changes, and upon recognition of a designated keyboard command, activated by the user, interrupt handler 44 will return the system to its normal detection modes.

In summary, the detection cycle is continous. Sensor polling and stochastic analysis occur periodically. Stochastic polling, however, occurs less frequently. The response and temporal queue processors are constantly monitored and are activated when queue designation indicates necessity to do so, i.e., elapsed time limit is reached. The mode control allows keyboard initiated access only. The response queue processor has absolute priority, and the mode control keyboard has second priority over all other functions.

Figure 5:
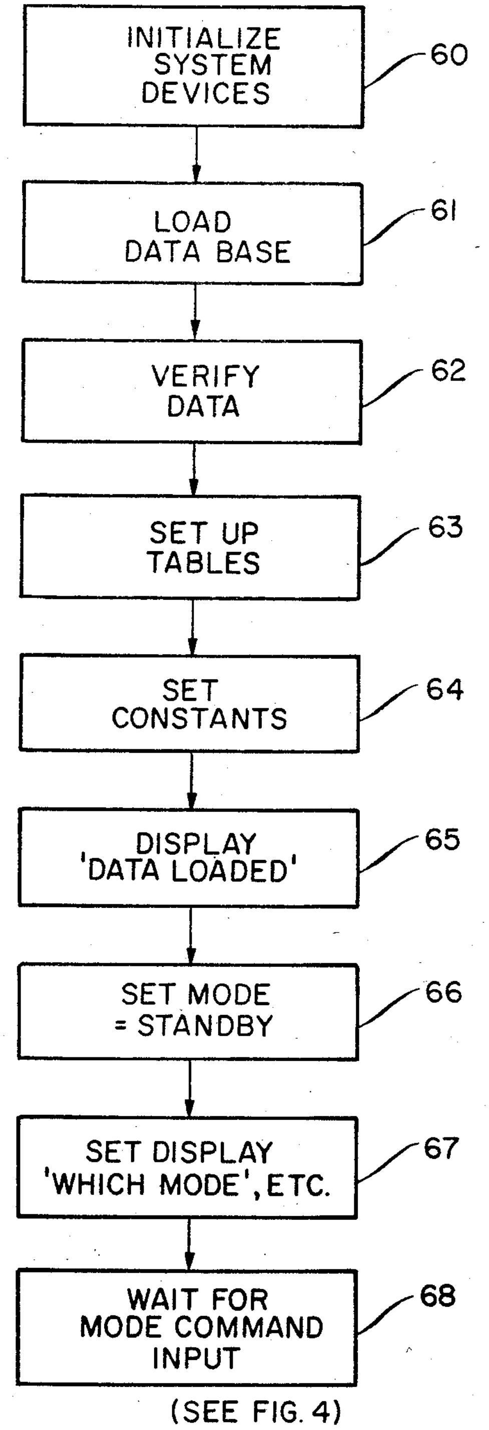
FIG. 5 is a detailed diagrammatic flow chart of one manner of implementing the system start-up function depicted in FIG. 4.
Figure 6A:
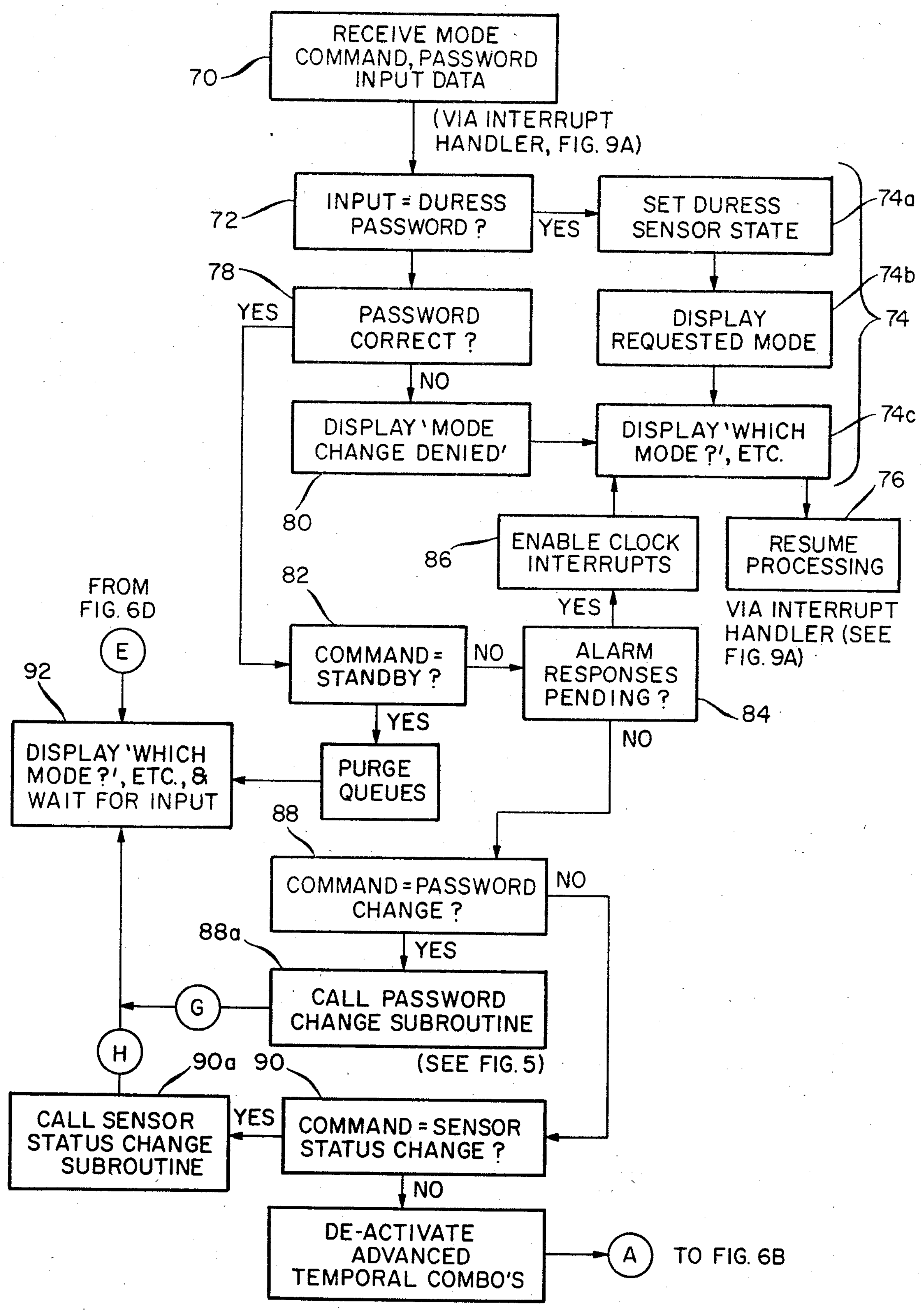
FIG. 6 (FIGS. 6A–6E) is a detailed diagrammatic flow chart of one manner of implementing the mode control function depicted in FIG. 4.
Figure 6B:
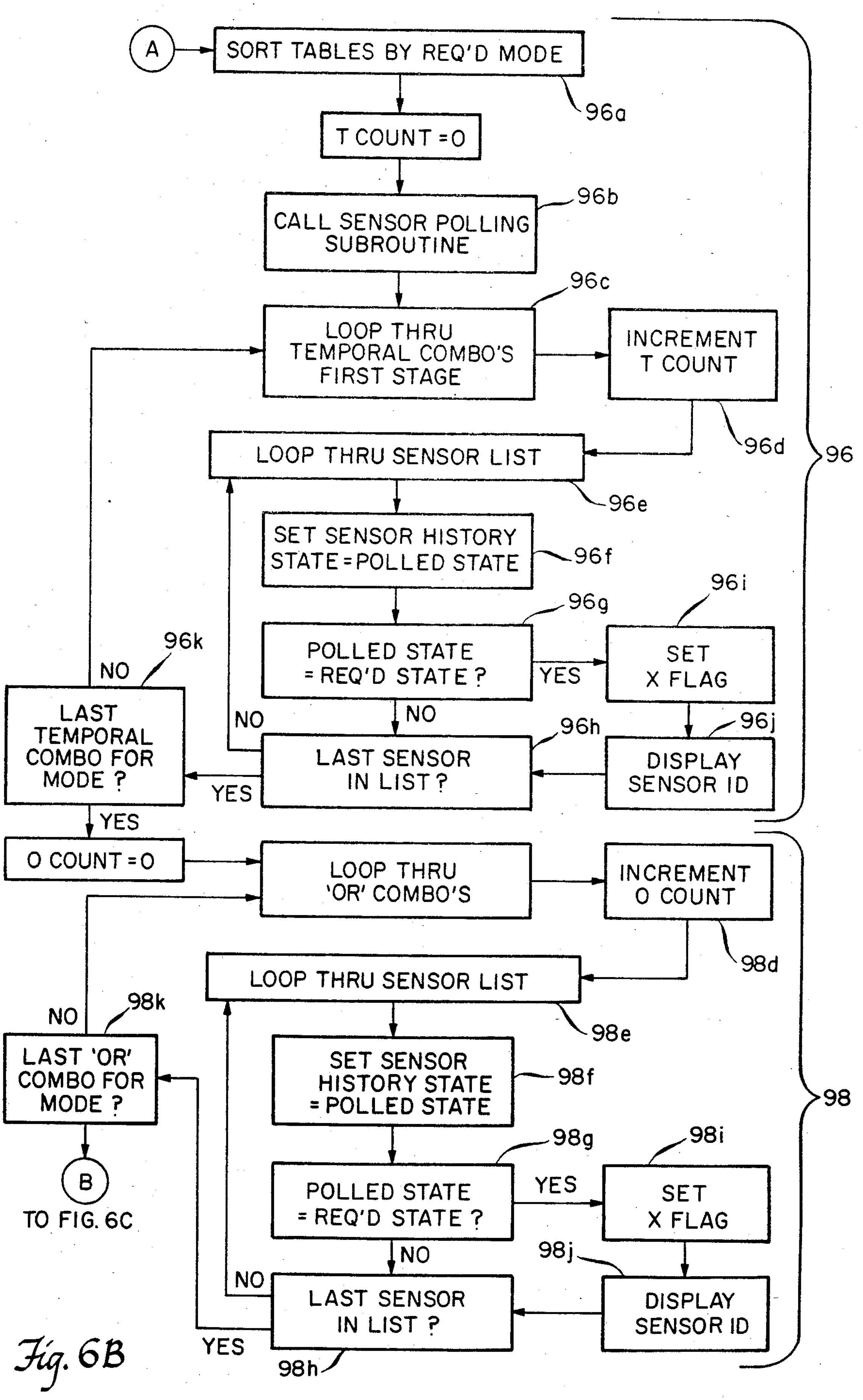
Figure 6C:
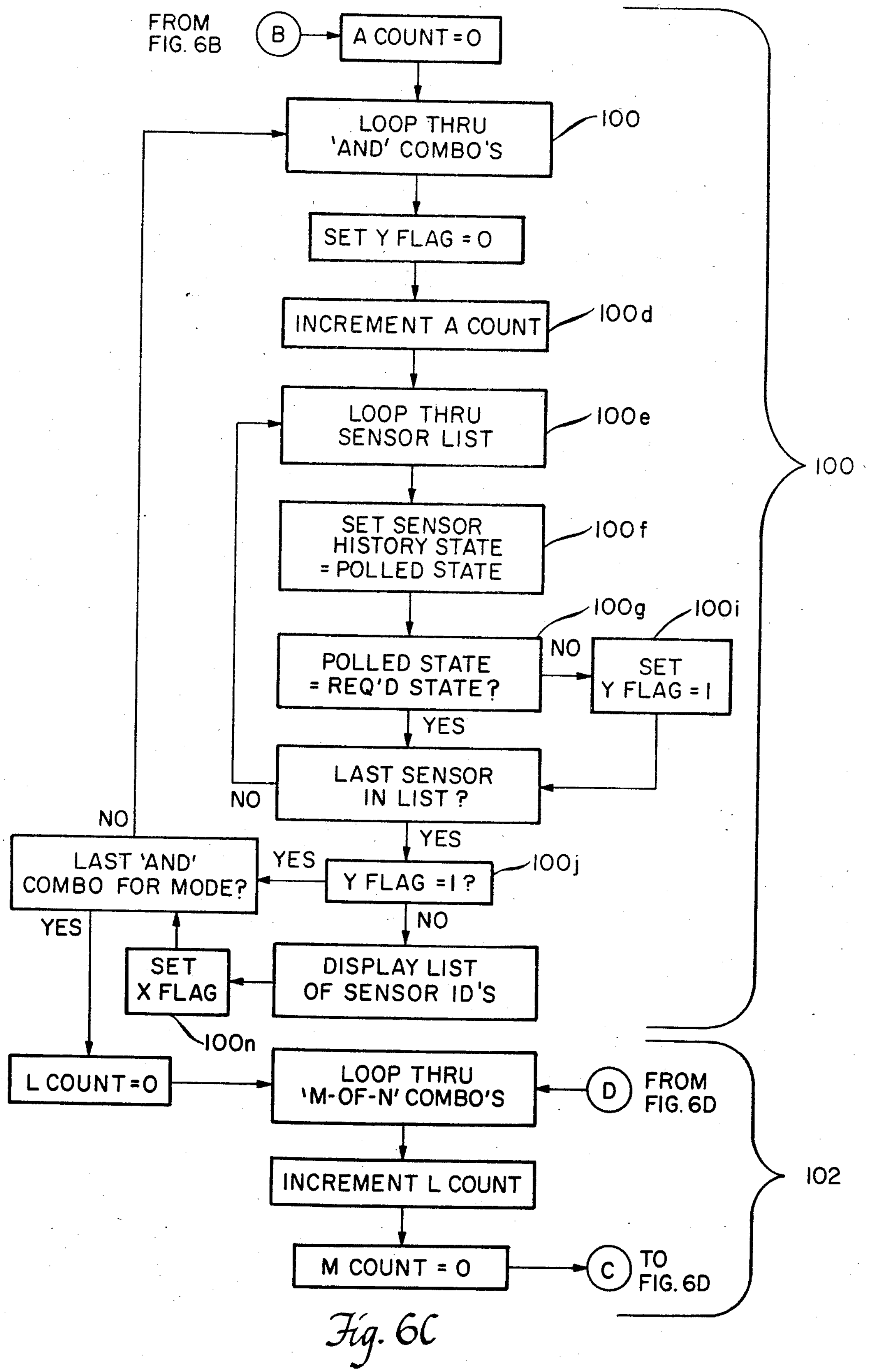
Figure 6D:
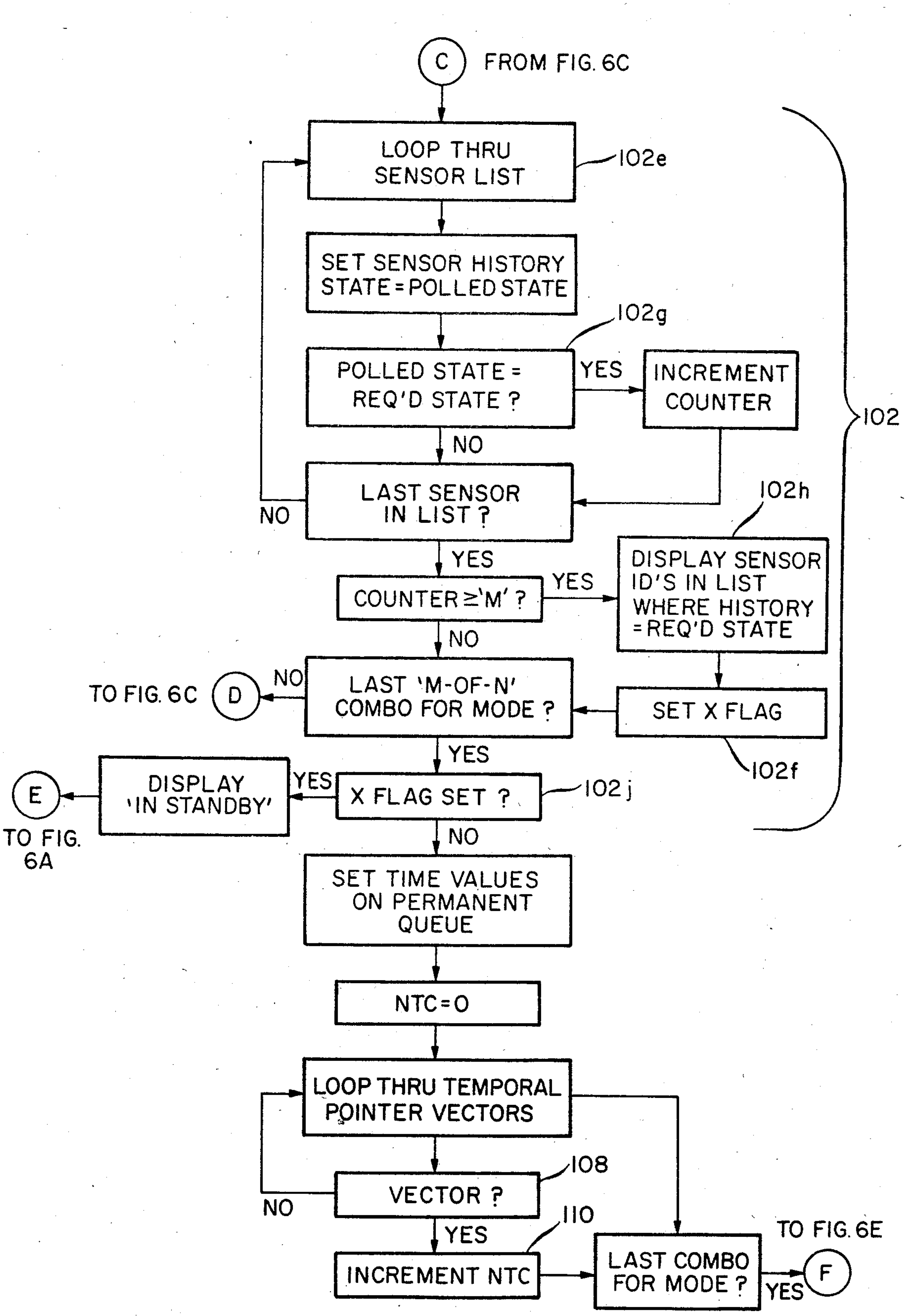
Figure 6E:
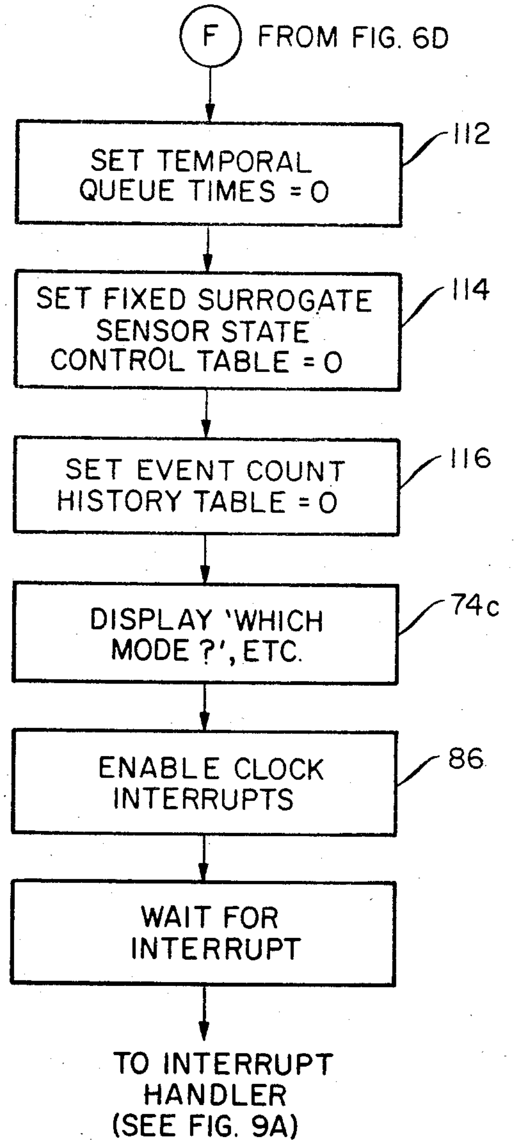

The system start-up function (42, FIG. 4) is outlined in greater detail in FIG. 5. The system devices are initialized in step 60. An appropriate data input instruction is displayed on the input device 61, and is the data loaded and verified 62. The state tables are set up 63 and constants are set 64. An appropriate verification of receipt of the loaded data is displayed on the input device 65 when the data has been properly loaded.

The system is then placed in a standby status 66 and a notation appears requesting the security operator to select one of the available mode commands 67. The system then awaits the selection of the desired mode command 68.

The mode control function, outlined in FIG. 6, receives (at step 70) an input mode command and password. If the input includes a duress password, as determined at 72, loop 74 is activated, in which a duress sensor state is set to duress status 74a, the display indicates the requested mode 74b. Then requests additional mode input 74c in order to resume conventional processing 76 via interrupt handler 44, FIG. 4.

If, at step 72, the password is not detected as a duress password, it will be tested for valid access 78. If it is determined to be an invalid password, the display so indicates 80, and the system awaits addition mode control instructions 74c.

If the password is determined to be a valid access password, the command is tested to determine if "stand-by" mode is desired 82. If "stand-by" mode has not been selected, the system tests whether alarm responses are pending 84. If so, the clock interrupts 86 are enabled to process the pending responses and the system again awaits mode control command 74c.

If there are no alarm responses pending, the system attempts to determine whether a password change 88 or a sensor status change 90 is desired. If either change is desired, the appropriate subroutine is called, 88a or 90a respectively. After the appropriate subroutine is completed, the system awaits additional mode control commands 92. If neither password or sensor status change functions are desired, any advanced temporal combinations stages are de-activated 94 and loop 96 is processed in which the pointer vector tables are sorted 96a by their required mode, the sensor polling routine 96b is called. Then the first stage temporal combinations to be processed 96c and incremental advancement of the "t count" variable 96d. The state of each sensor in the list for the first stage of each temporal combination is inserted into the history field 96f, to correspond with the most recent sensor polling. The current state is compared with its required state 96g. The sensor list process is repeated until the last sensor has been checked, as determined at step 96h. If a current sensor state, as polled, is equivalent to a required sensor state, an indicator flag is activated 96i, and that particular sensor is indicated 96j on a display device.

When the last temporal combination has been tested, as determined at step 96k, the disjunctive combination ("or" combinations) loop 98 is activated. Each "or" combination within the loop is tested as the "o count" variable is incremented 98d. The sensor polling loop 98e–98h is identical to that processed for each temporal combination tested above, and an indicator flag is activated 98i and the appropriate sensor designated 98j when a current polled sensor state is identical to the required sensor state as indicated by 98g.

When the last sensor has been polled, as indicated by 98h, the next sequential "or" combination is tested. When the last "or" combination has been tested 98k, the series of conjuctive combinations ("and" combinations) are tested. Each "and" combination is tested (Loop 100) in the same manner as described above. A designating flag is activated 100i when a current sensor state is not equivalent to each required sensor state for each "and" combination.

In testing the "and" combinations, it is necessary that the required sensor state be present for each of the sensors within the combination before an alarm/response is activated. In order to test for this, the "Y-Flag" variable is set to one 100i if any sensor state does not satisfy the required sensor state in the combination.

When the "Y-Flag" variable is later looked at **100*j*, a warning will be issued 100*n*** if "Y-Flag" does not equal one. This results from the realization that a "Y-Flag" indication of one, would indicate that at least one of the "and" combination conditions was not met. That is sufficient to prevent alarm/response dispatch.

After each of the "and" combinations have been tested, the threshold quantity ("M out of N" combinations) are tested (Loop 102). Required sensor states that are satisfied **102*g* are indicated by an appropriate flag 102*f*. After each of the threshold quantity combinations have been tested, all of the sensors that have a current polled state, equivalent to the required state, are identified on the display device and a designation of the presence of such required state is presented 102*h***.

If the "X-Flag" variable is equal to one **102*j* after all of the threshold quantity combinations have been tested, it is indicative of at least one satisfied combination. The system then returns to "standby" status 103 and awaits mode control commands 92. If the "X-Flag" variable is not equal to one 102*j*, indicating no satisfied combination, the time values are set on permanent queue 104, and the temporal pointer vectors are looped 106, 108, 110 through 106 until the last temporal pointer vector applicable to the mode commanded is found. After the last combination in the mode has been completed, the temporal queue times 112, the fixed surrogate sensor state control table 114, and the event count history 116 are all reset to zero. The system then awaits additional mode control commands 74*c* and the interrupt clock 86 is re-enabled to permit further processing by interrupt handler 44, FIG. 4**.

Figure 7:
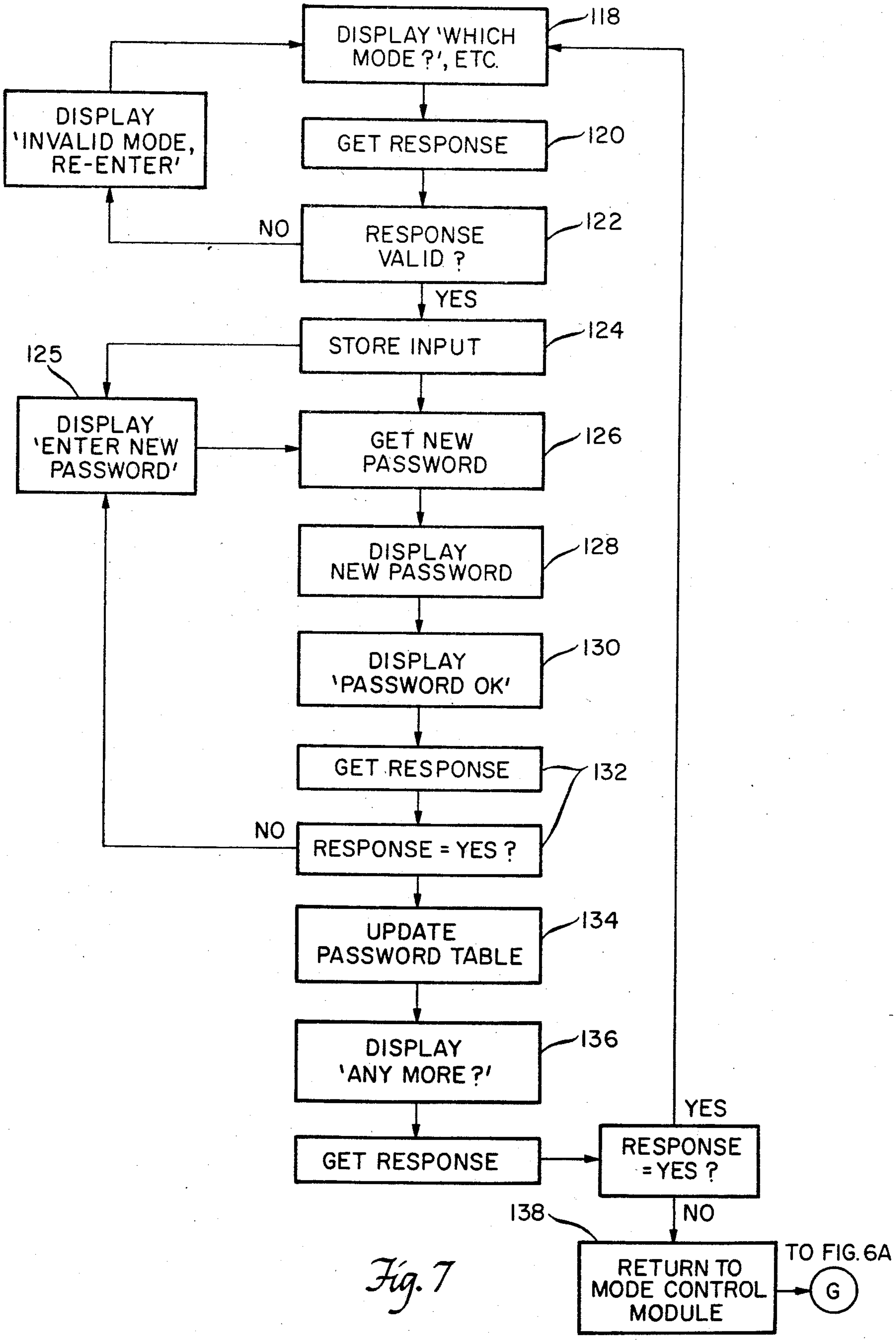
FIG. 7 is a detailed diagrammatic flow chart of one manner of implementing the password change function depicted in FIG. 4.
Figure 8A:
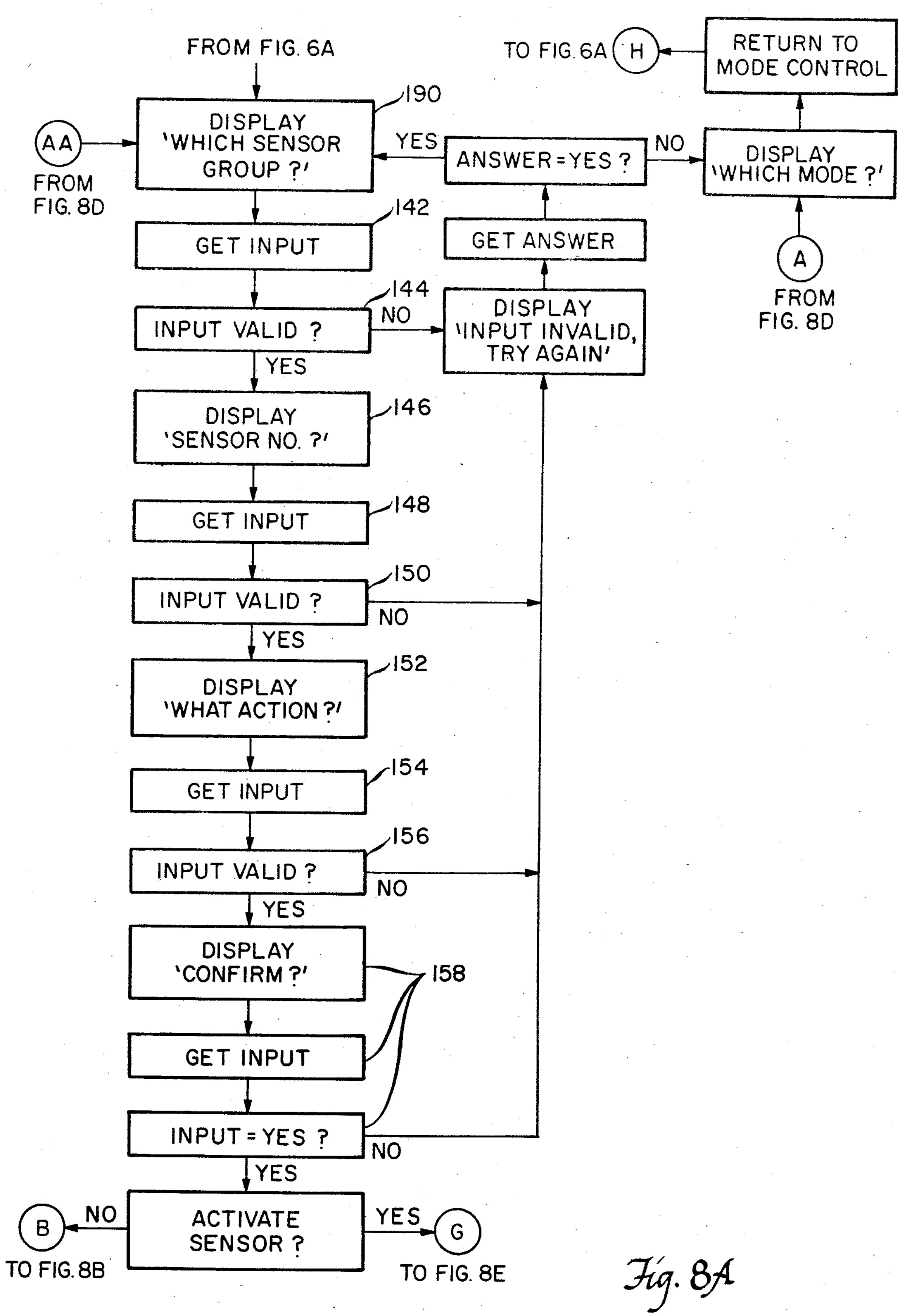
FIG. 8 (FIGS. 8A–8G) is a detailed diagrammatic flow chart of one manner of implementing the sensor status change function depicted in FIG. 4.
Figure 8B:
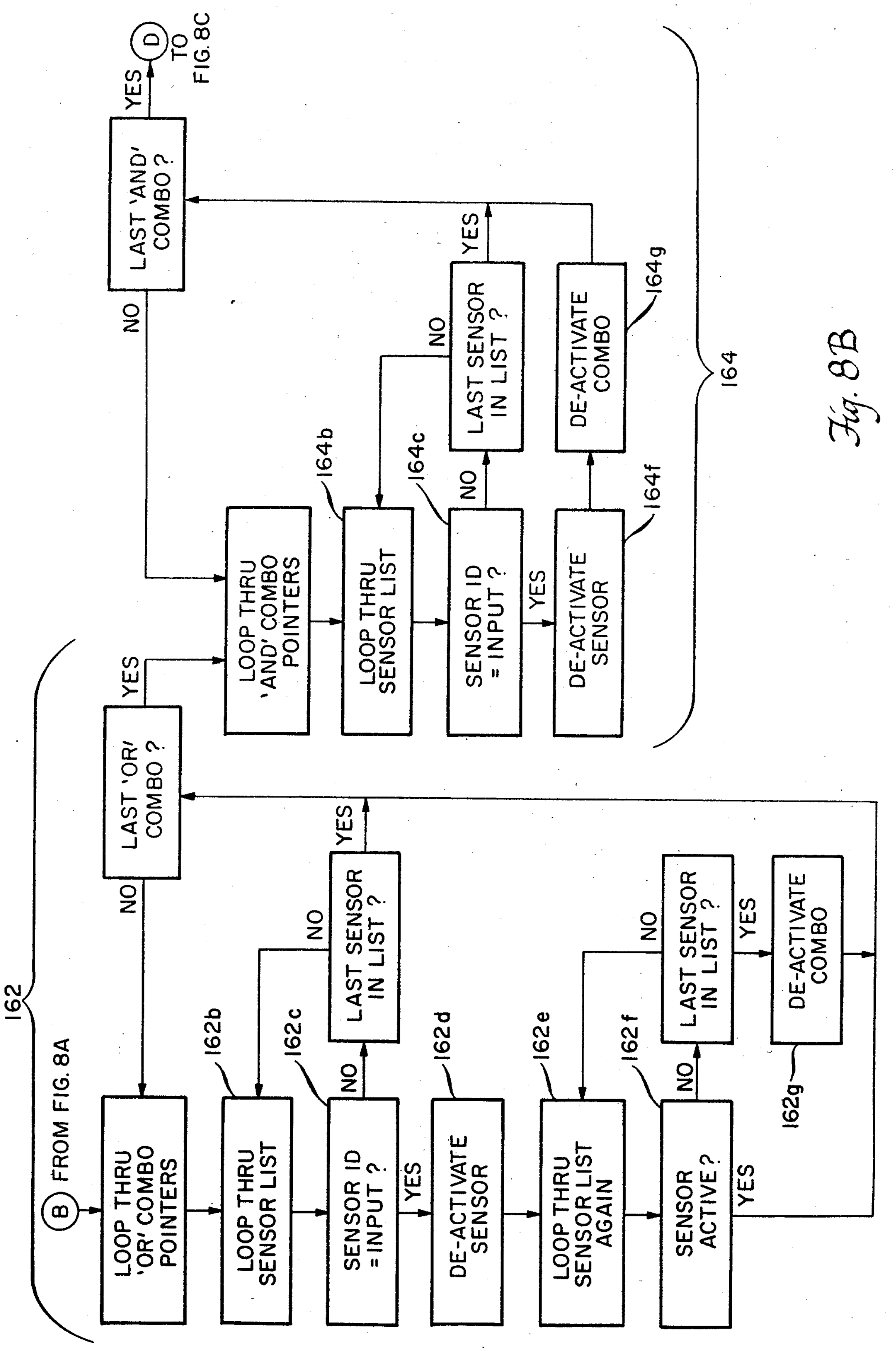
Figure 8C:
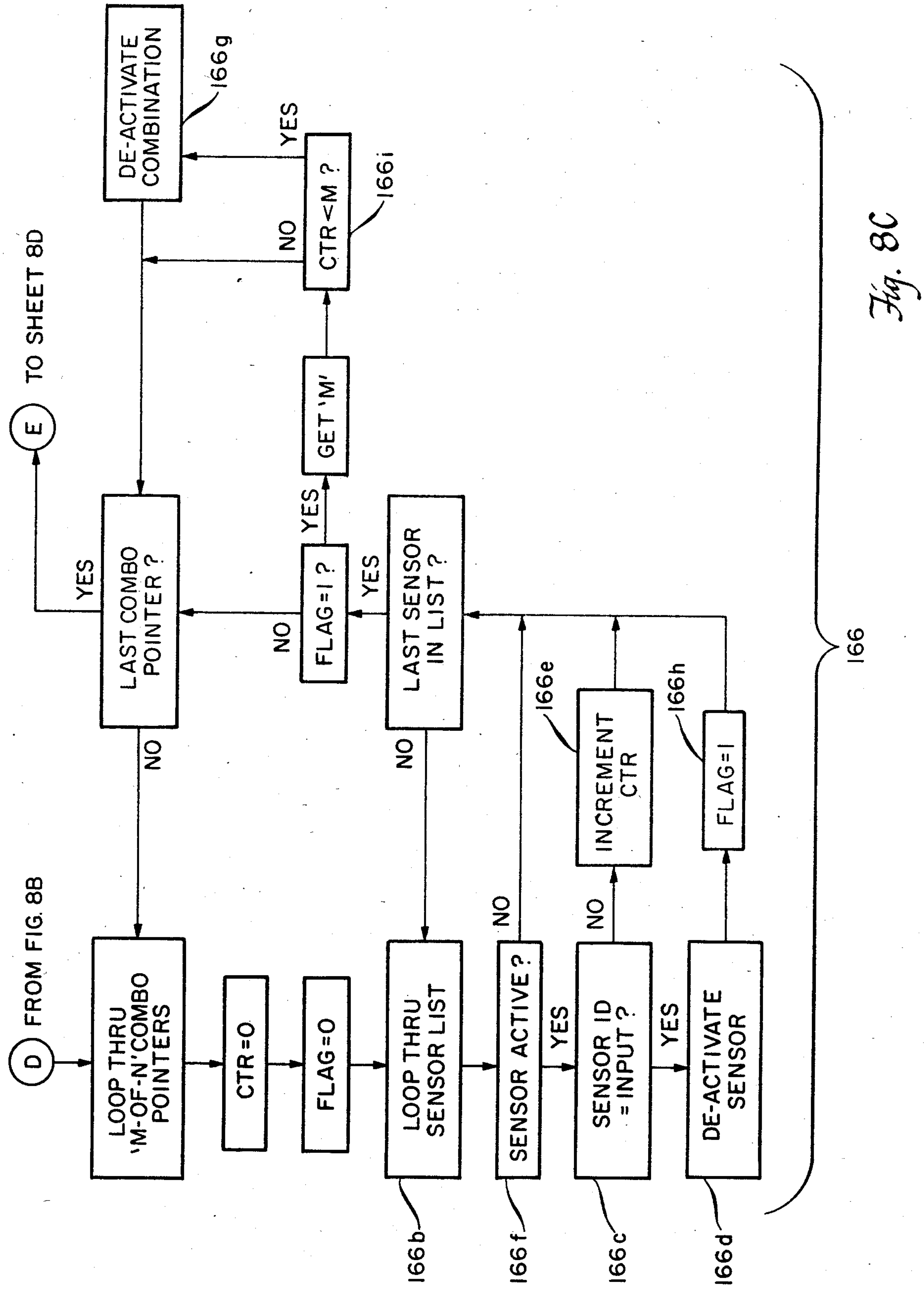
Figure 8D:
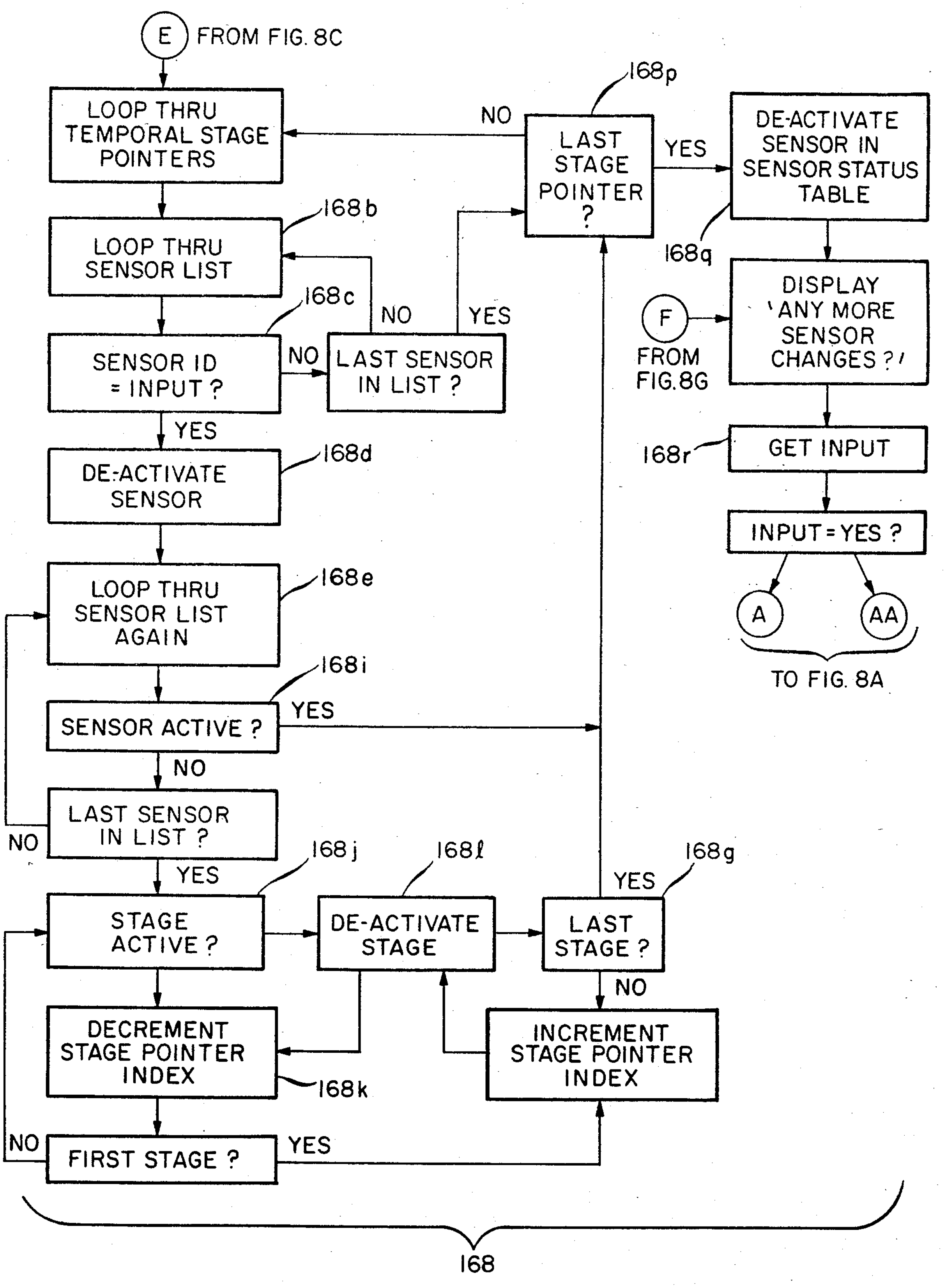
Figure 8E:
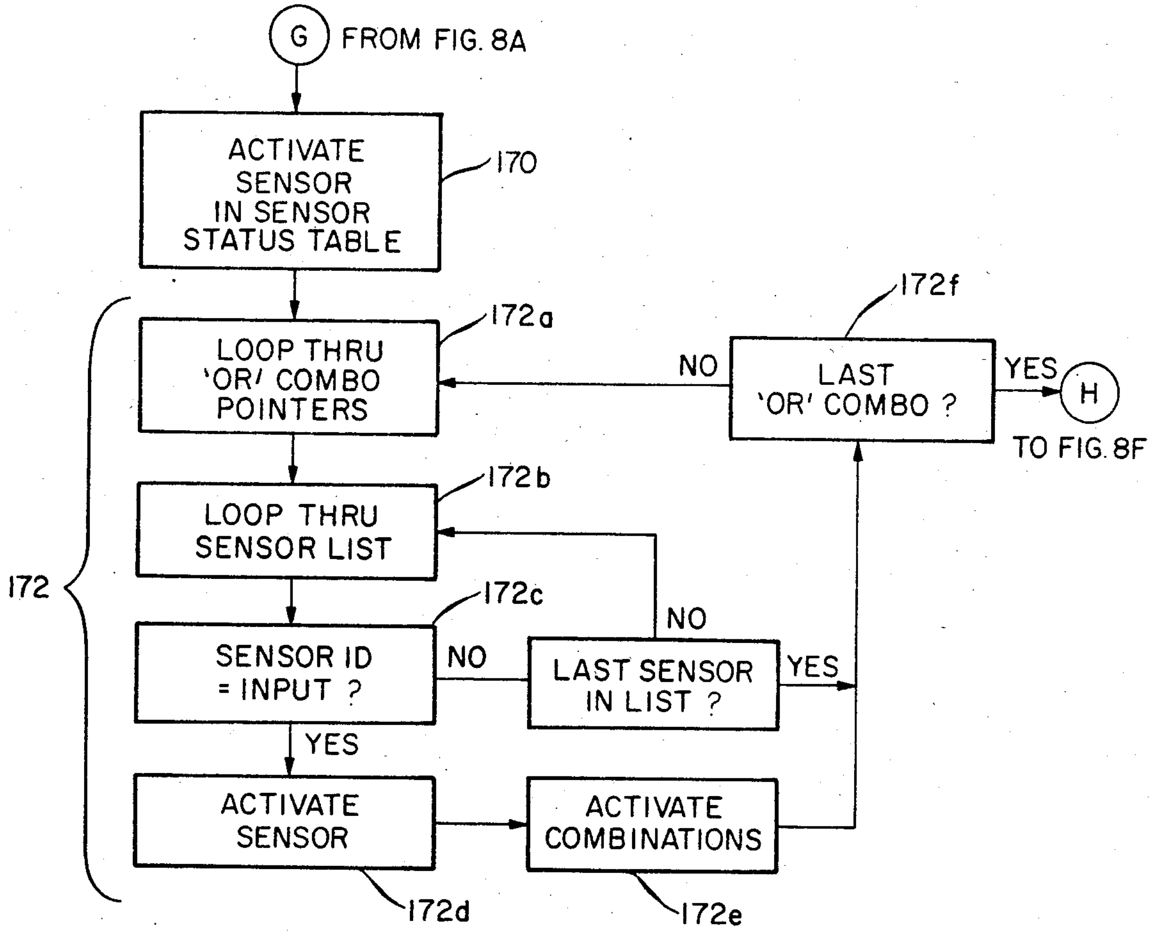
Figure 8F:
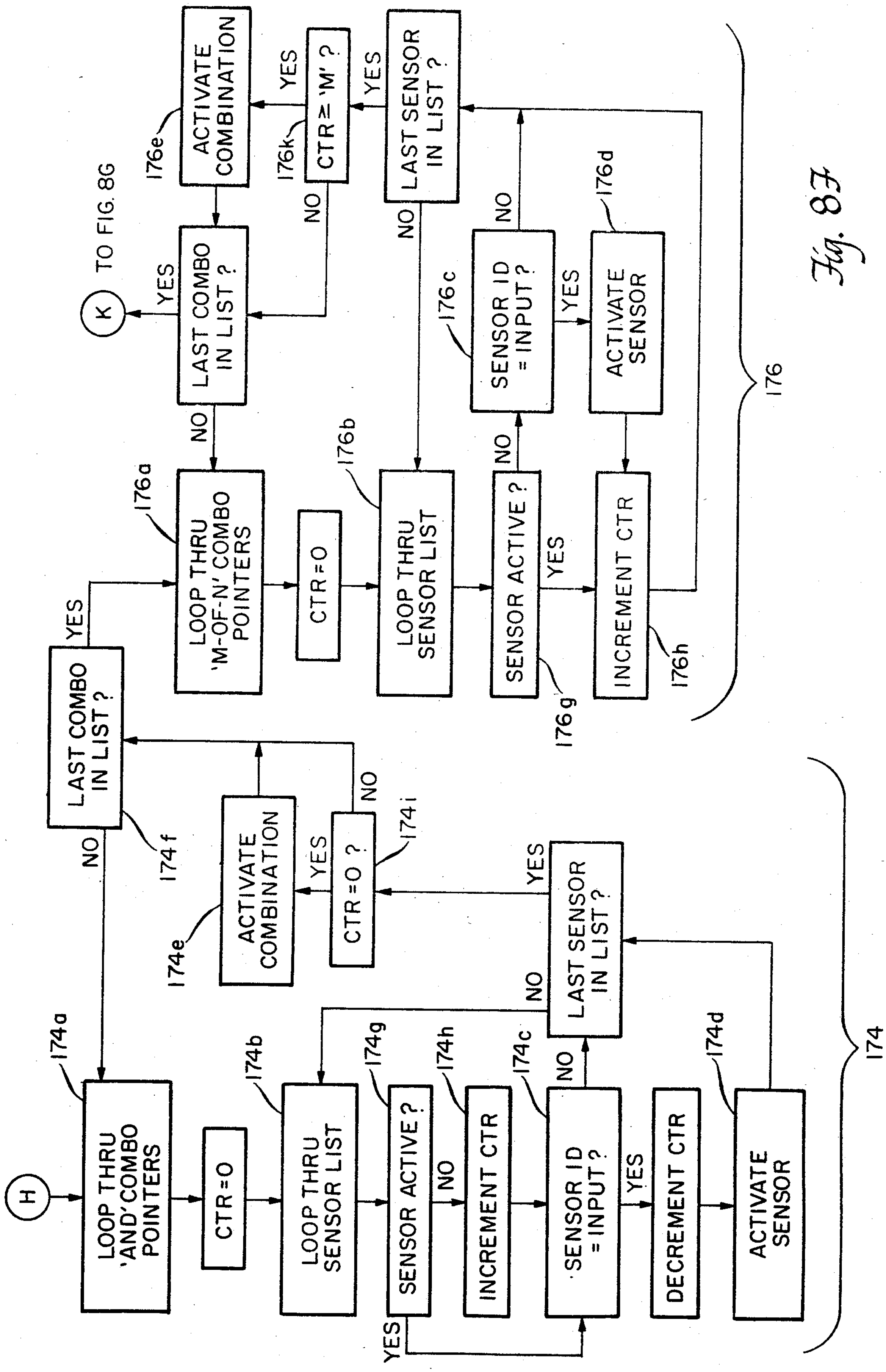
Figure 8G:
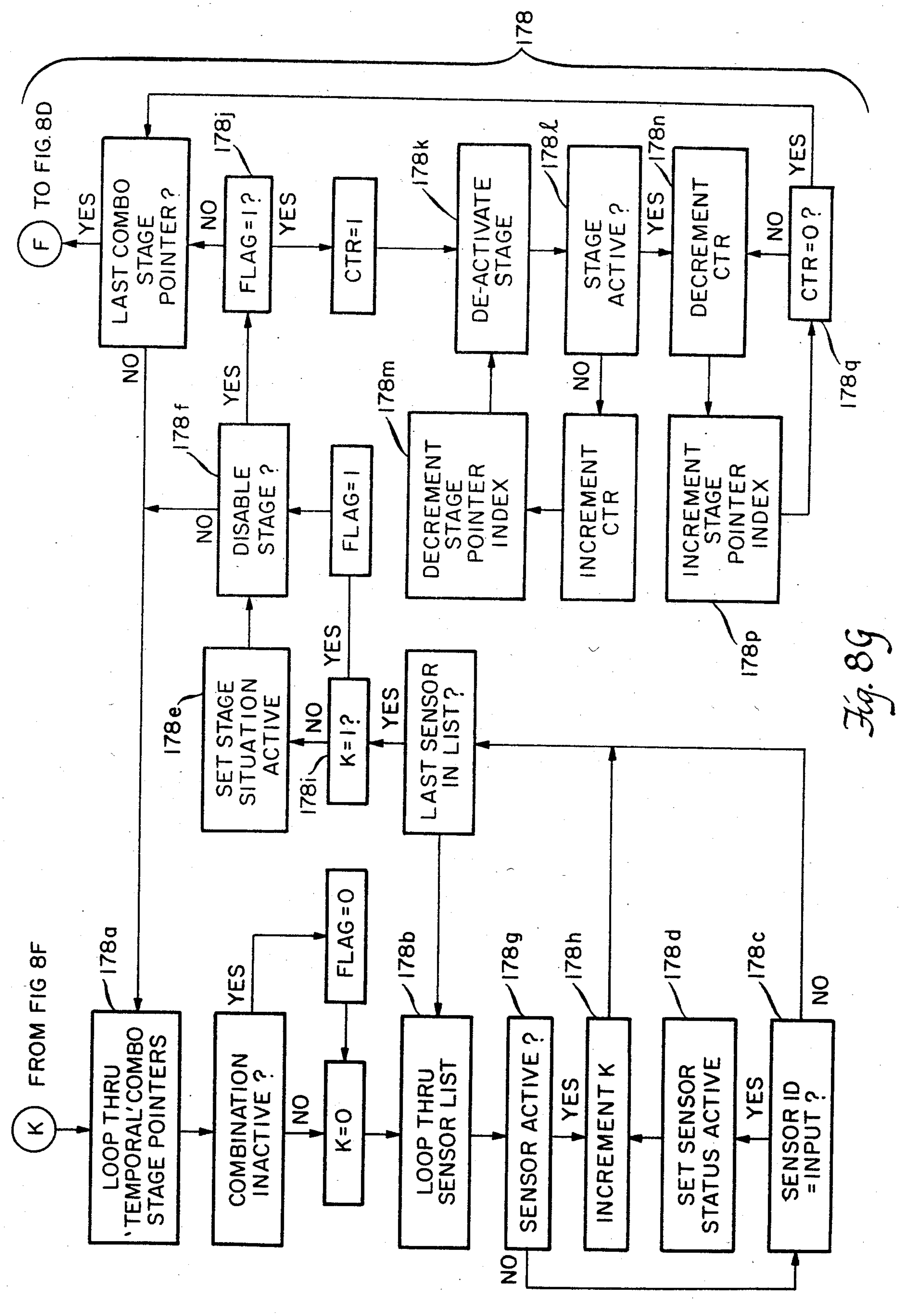

The password change function is outlined in FIG. 7, in which the input command is sought 118, received 120, and tested for validity 122. Upon receipt of a valid password change command, the input is stored 124 and a new password is requested 125 and received 126. The new password is displayed 128 and verified for accuracy 130 and 132. The password table is updated 134, and additional mode commands are sought 136. If no additional mode variations are desired, the system returns to the mode control module 138.

The sensor status change function is shown in FIG. 8 in which a desired sensor group designation is sought 140, received 142 and tested for validity 144. The desired sensor number is then requested 146, received 148 and verified as an accurate input 150. The desired instruction or modification is then requested 152, received 154, and validated as accurate 156. The appropriate action desired is then confirmed 158 before the sensor status is actually altered, and if confirmed, the user is asked whether to activate the appropriate sensor 160. If "no" is selected, indicating a desire to deactivate the sensor, each of the "or" combinations (loop 162), "and" combinations (loop 164), threshold quantity combinations (loop 166), and temporal combinations (loop 168) are tested to insure that de-activation of the desired sensor will not jeopardize the reliability of the combination beyond its effective usefulness. In each of these testing procedures, each individual combination within each of the four catagories is tested to determine whether the desired sensor is included in that particular combination **162*c*–168*c*. If the desired sensor is found to be included and active, it is de-activated 162*d*–168*d*. In the "or" combinations the list of sensors are looped through again 164*e* to verify that all of the sensors have not been deactivated 162. If all of the sensors in an "or" combination have been deactivated, that entire combination is de-activated 162*g***.

After all the "or" combinations have been tested for the overall effect of the desired sensor status change, each of the "and" combinations will be tested (Loop 164) in the same manner. Those "and" combinations which include the particular sensor to be de-activated, will also be de-activated **164*g***.

After all of the "and" combinations have been tested for inclusion of the particular sensor, which is to be de-activated, each of the threshold quantity combinations will be tested (Loop 166) to insure that de-activation of that particular sensor will not destroy the reliability of that particular threshold quantity combination. The sensor list of each threshold quantity combinations is checked for the number of active sensors **166*f* and inclusion 166*c* of the particular sensor to be deactivated. The control variable (ctr) is incremented 166*e*, for each active sensor encountered other than the particular sensor to be changed. When the particular sensor to be changed is encountered, it is de-activated 166*d*, and indicator "flag" variable is set to equal one 166*h*. When the last sensor in the list has been tested, the threshold quantity (m) is tested 166*i* against the number of remaining active sensors (ctr), to insure that the threshold quantity does not exceed the number of active available sensors remaining. If the threshold quantity exceeds the number of active remaining sensors, for any particular combination, that particular combination will be de-activated 166*g***. If not, the next sequential threshold quantity combination will be tested in the same manner until all threshold quantity combinations have been tested.

After all threshold quantity combinations have been tested, the temporal combinations will be tested in the same manner (loop 168), to insure that particular temporal stages will be de-activated if the de-activation of the desired sensor will jeopardize the reliability of that or subsequent particular temporal stages. Each sensor within each temporal combination is checked **168*b* to find the particular sensor to be de-activated 168*c*, and to determining whether any remaining sensors are active 168*i***.

If there are no active sensors remaining in a particular temporal stage, that stage is looked at **168*j* to determine whether it is still active. If it is, the stage is de-activated, then each preceeding stage is checked for its status. Each time a preceeding stage is found to still be active 168*j*, it is de-activated, until the first stage is found. The system then loops 168*l*, 168*g*** through all stages of that combination and de-activates all remaining active stages, thus removing that combination from the detection process until its integrity is restored via activation of the minimum number of sensors.

If this is the last temporal stage, as indicated by **168*p*, the particular sensor is deactivated, 168*q*, and the system awaits additional sensor status change instructions 168*r*. If additional sensor status changes are not desired, the system awaits additional mode control commands 118**.

If, at point 160, an operator wishes to reactivate rather than de-activate a particular sensor, the sensor is activated 170 in the sensor status table and each of the combinations in each of the four categories is tested to ascertain whether reactivation of that particular sensor will allow for reliable re-activation of any of the combinations, previously de-activated. If so, those particular combinations will be reactivated.

The "or" combinations are processed in loop 172. The "and" combinations are processed in loop 174, and the threshold quantity and temporal combinations are processed in loops 176 and 178, respectively.

In the disjunctive category ("or" combinations) the list of sensors in each combination is looked at **172*b* in an attempt to locate the particular sensor to be reactivated. If that particular sensor is not found at 172*c*, the next successive "or" combination is looked at 172*a*. If the particular sensor is found at 172*c*, the sensor is reactivated 172*d*. In the "or" combinations, the existance of a single active sensor is sufficient to satisfy a particular combination. Each combination containing a sensor to be reactivated, therefore is likewise reactivated 172*e*** when the sensor is reactivated.

When all of the "or" combinations have been checked for inclusion of the particular sensor to be reactivated and appropriate reactivation has occurred, the system proceeds to testing the "and" combinations (Loop 174) for inclusion of the particular sensor to be reactivated.

Each of the sensors is looked at **174*b* in each combination 174*a* to find the particular sensor to be reactivated 174*c*. If a particular combination contains any inactive sensor, as determined at 174*g*, the "ctr" variable will be incremented 174*h* and will later prevent reactivation of that particular combination 174*i*. If there are no inactive sensors after reactivation of the subject sensor, variable "ctr" will remain equal to zero, thereby enabling the reliable reactivation of the entire combination 174*e***. Each combination is therefore, reactivated whenever all sensors within the combination are active.

After all of the "and" combinations are tested for reliable reactivation potential, the threshold quantity combinations ("M out of N") are tested (loop 176) for reliable reactivation potential. Each of the combinations **176*a* is analyzed for its inclusion of the subject sensor 176*c*. As the sensor list is looked at 176*b*, the number of active sensors encountered 176*g* is designated by the "ctr" variable 176*h*. When the subject sensor is encountered 176*c*, it is reactivated 176*d* and the "ctr" variable is incremented 176*h*** to reflect the additional active sensor.

When the last sensor in each combination has been looked at, the number of active sensors in the combination, as designated by the variable "ctr", is compared **176*k* to the threshold quantity (m) necessary to dispatch an alarm/response activity. If the necessary threshold quantitiy (m) of a particular combination, exceeds the number of available active sensors (ctr), the combination will remain deactivated. If, however, the number of available active sensors (ctr) exceeds the threshold quantity (m) necessary for appropriate alarm/response activation, the combination will be reactivated 176*e***.

When all of the threshold quantity combinations have been analyzed for reliable reactivation potential, the temporal combinations are looked at for reliable reactivation potential (Loop 178).

The sensors in each temporal stage are scanned **178*b* to determine the status of each 178*g*, and to determine inclusion of the particular sensor that is to be deactivated 178*c*. If there are active sensors or if the sensor to be activated is included in the stage currently being looked at, variable "k" is incremented 178*k* and after all sensors in that stage are tested, if the "k" variable is equal to one 178*i*, indicating that the stage was inactive and it contained the sensor being de-activated and that entire stage is reactivated 178*e***.

When all stages in a combination have been checked for a sensor re-activation, if any remain de-activated, then all stages are de-activated.

Figure 9A:
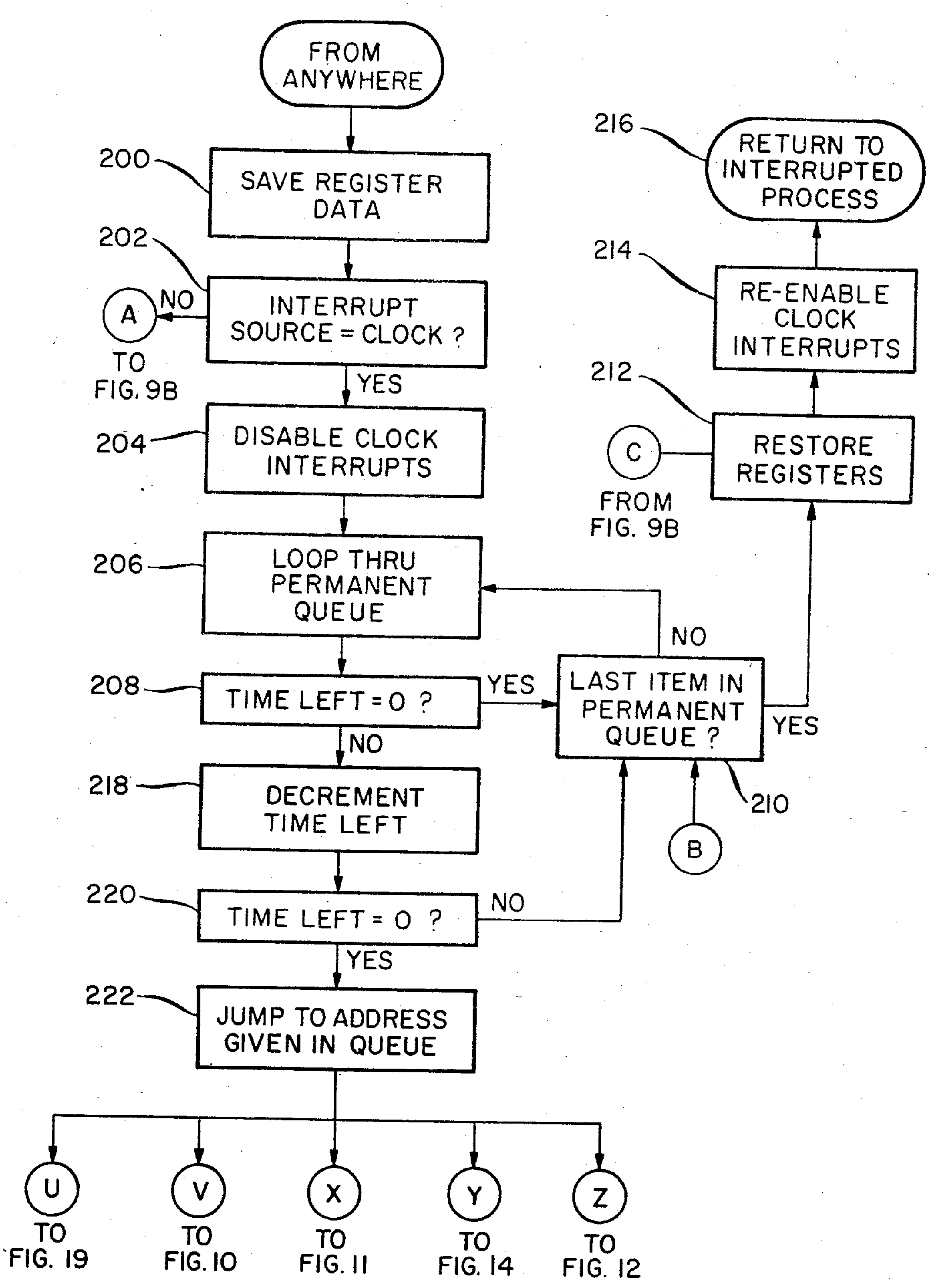
FIG. 9 (FIGS. 9A–9B) is a detailed diagrammatic flow chart of one manner of implementing the interrupt handler function depicted in FIG. 4.
Figure 9B:
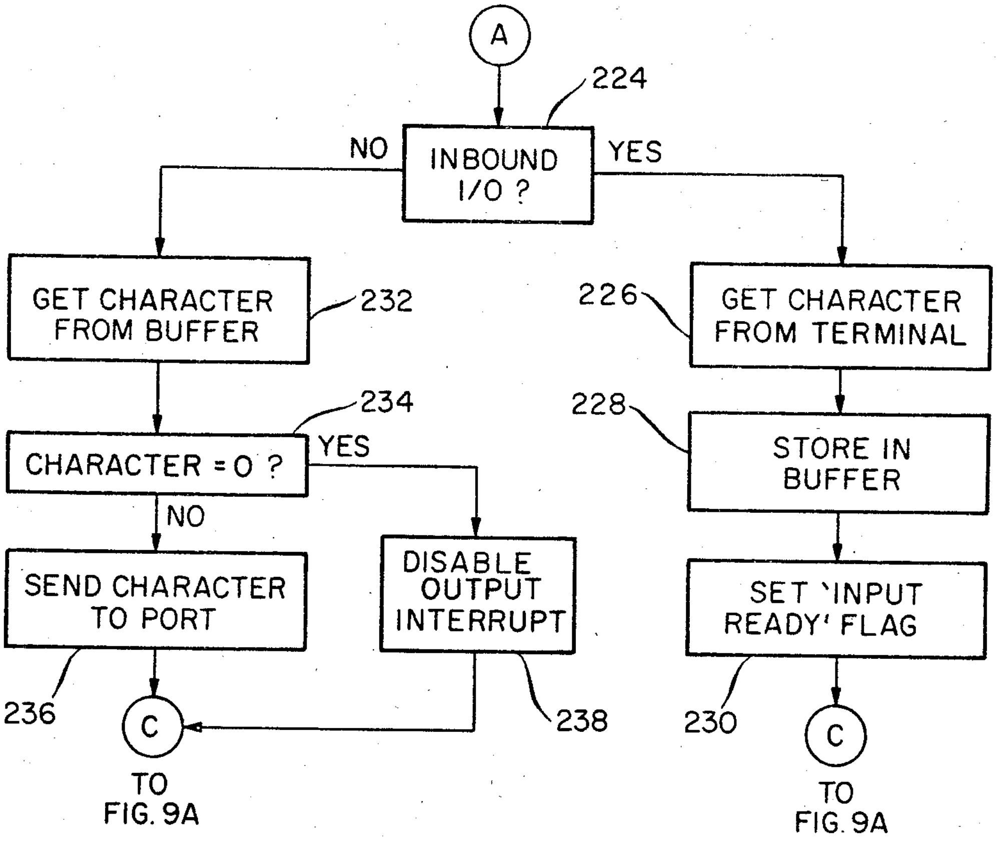

The interrupt handler flow chart is shown in FIG. 9 in which the register data is saved in step 200 and the interrupt source is tested against the clock 202. If the interrupt source is equal to the clock, the clock interrupt will be disabled 204, and the system will loop through the permanent queue 206. The time remaining value is then tested 208. If there is no time remaining the next permanent queue item 206 is tested against time remaining 208 until the last item is tested as indicated at 210. When the last item has been tested, the registers are restored 212, the clock interrupt is re-enabled 214 and the system returns to the interrupted process 216.

If there was time remaining 208, when the items were tested 206, that time would be decremented 218 and tested again 220. If there was still time remaining, the next item in the permanent queue would be tested 210 and 206. If there was not time remaining at step 220, the interrupt handler would access the particular address designated in the permanent queue 222. This may cause access of the routines described in FIGS. 10, 11, 12, 13, 14, or 20.

If at point 202, the interrupt source value did not equal the clock value, the system would inquire whether inbound input or output functions are desired 224. If so, the system would retrieve a command character from the terminal 226, store it in a buffer 228, and set the "input ready" flag accordingly 230. The registers would then be reset 212, the clock interrupt would be re-enabled 214 and the interruped process would be resumed 216.

If at point 224, an outbound input/output function is desired, the character is retrieved from the buffer 232, and tested 234. If the retrieved character is not equal to zero, the output interrupt is disabled 236. If the retrieved character is equal to zero, it is sent to the destination port 238, and the registers are reset 212, the clock interrupt is re-enabled 214 and the system returns to the interrupted process 216.

Figure 10A:
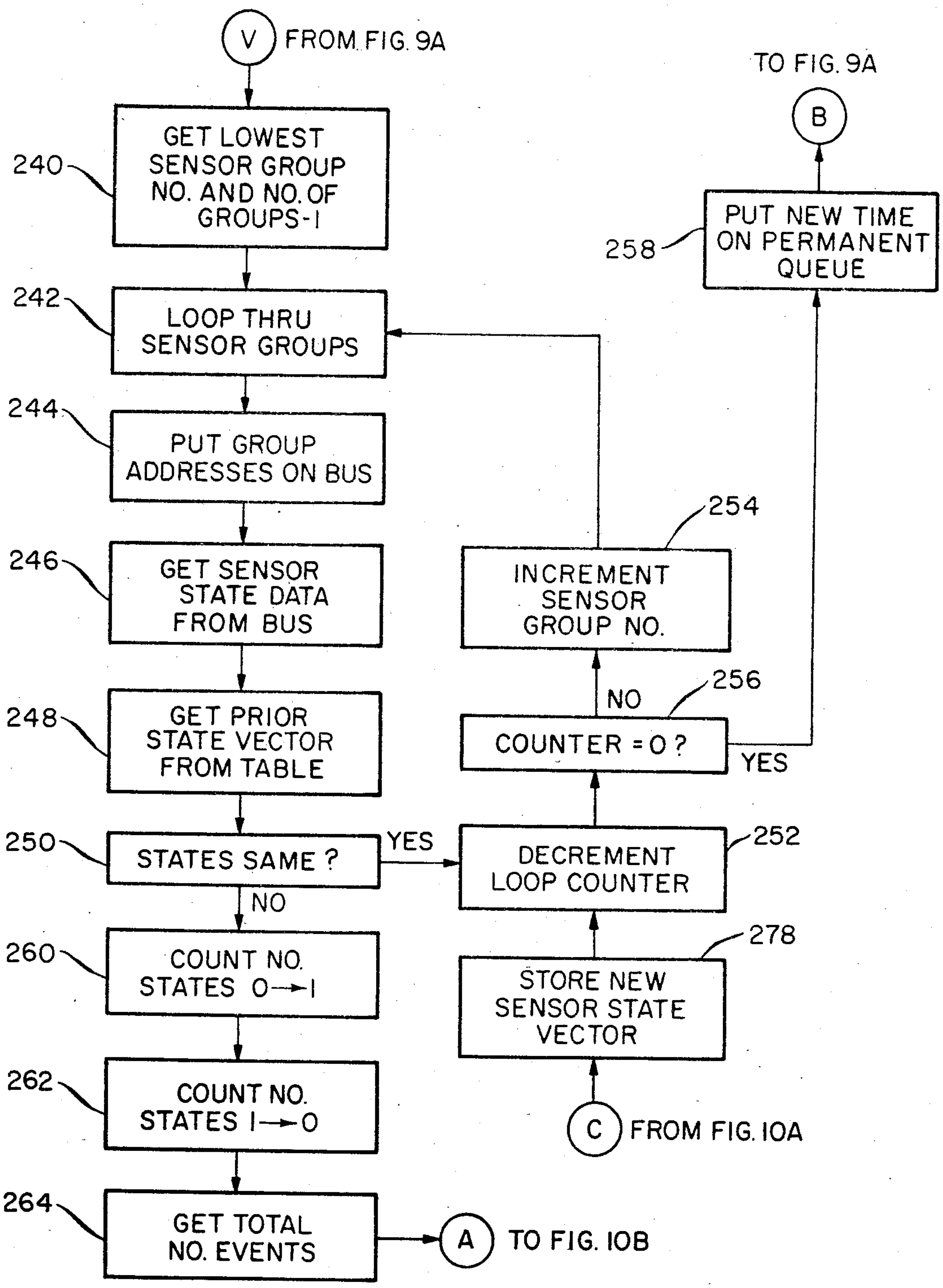
FIG. 10 (FIGS. 10A–10B) is a detailed diagrammatic flow chart of one manner of implementing the sensor polling function depicted in FIG. 4.
Figure 10B:
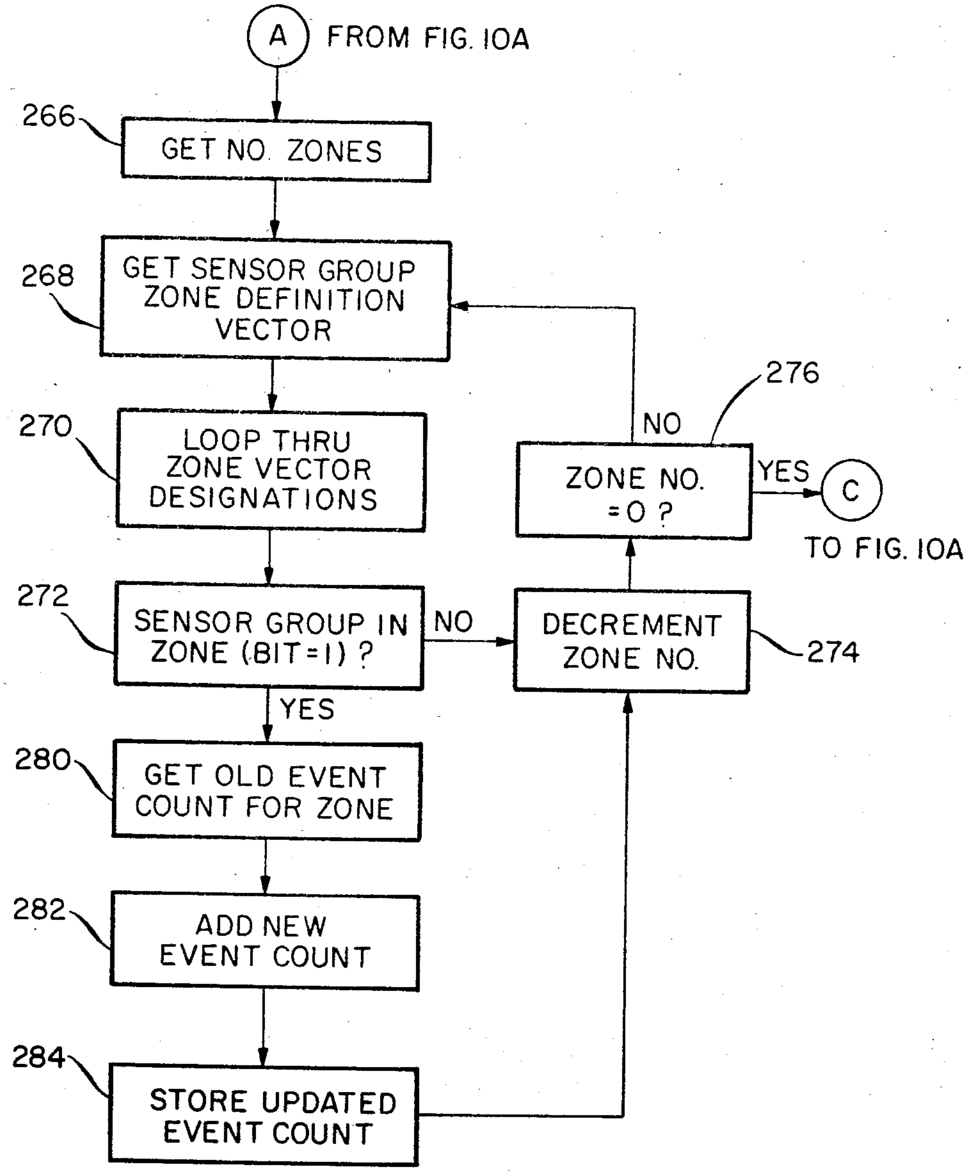

The basic sensor polling routine is outlined in FIG. 10, in which the lowest group number of sensors and the number of groups minus one are determined 240. The sensor groups are then looped through 242 and each group address is placed on the bus 244. The sensor state data is retrieved from the bus 246 and the prior sensor state vector is retrieved from the appropriate data table 248. The two sensor states (current and prior) are then compared 250, and if they are the same, the sensor loop counter is decremented 252 and each subsequent sensor group is processed in the same manner 254 and 242 et. seq. until the loop counter value equals zero 256, at which time a new time is placed on permanent queue 258 (see FIG. 9).

If at point 250 the current and prior sensor states are not the same, the quantity of sensor state changes from zero to one is counted 260, and the quantity of sensor state changes from one to zero is counted 262. These two quantities are summed 264, and are representative of the total number of recognizable events that have occurred from the last polling cycle.

The number of zones are then determined 266 and the sensor group zone definition vector is received 268. The vector designations are looped through 270 and the inclusion of the particular sensor group within the particular zone is tested 272. If that sensor group is not present in the particular zone being looked at, the next zone is checked for sensor group inclusion 274, 268, and 270. This process is continued until all zones have been examined, as determined at 276, at which point, the new sensor state vector is stored 278 and the next sensor group is processed 254, 242 et. seq.

If at point 272, the particular sensor group is included in the zone being examined, the prior event count for the zone will be retrieved 280 and added to the new event count 282, and the updated total will be stored accordingly 284. Each subsequent zone will be similarly processed for inclusion of each sensor group.

Figure 11A:
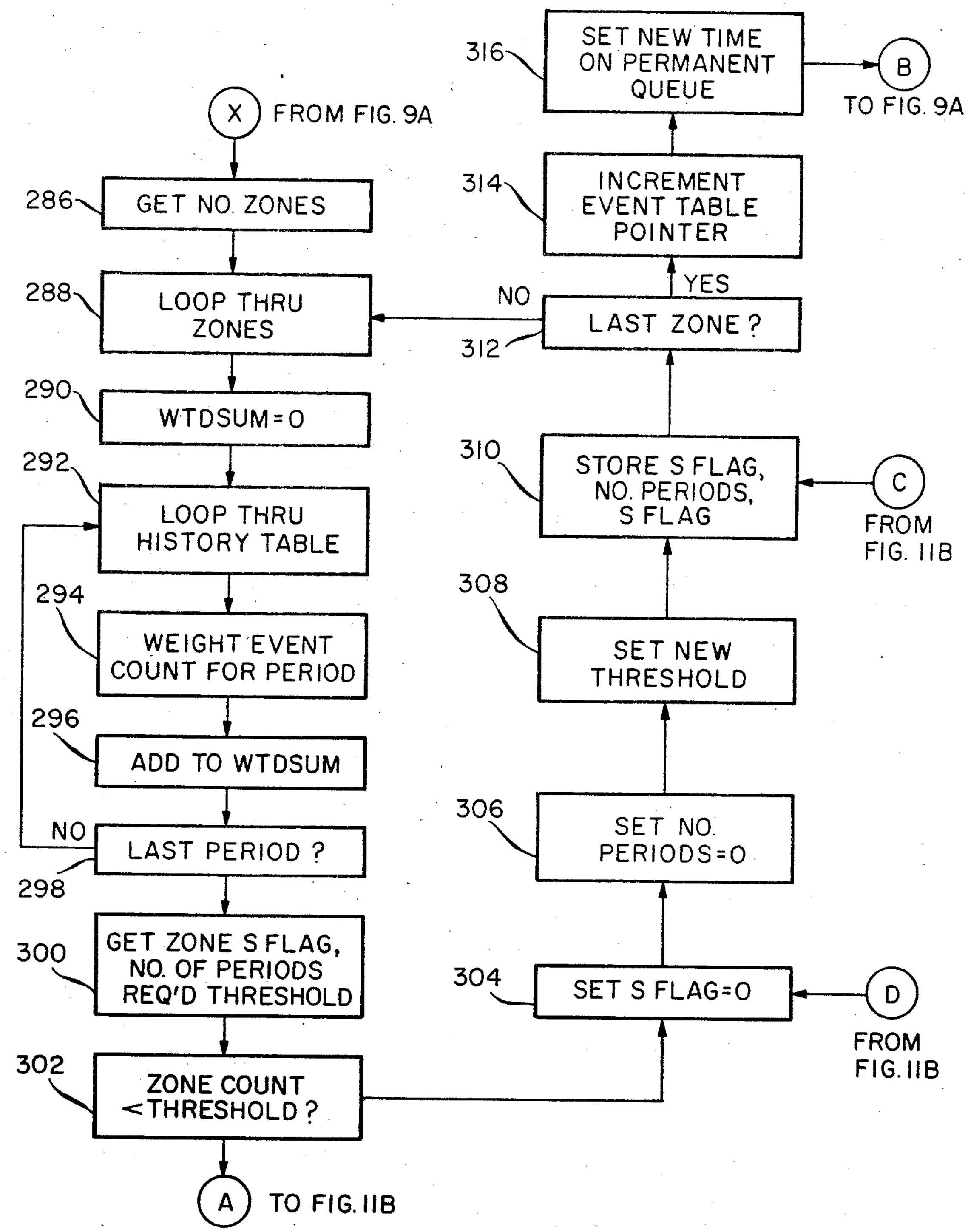
FIG. 11 (FIGS. 11A–11B) is a detailed diagrammatic flow chart of one manner of implementing the stochastic analysis function depicted in FIG. 4.
Figure 11B:
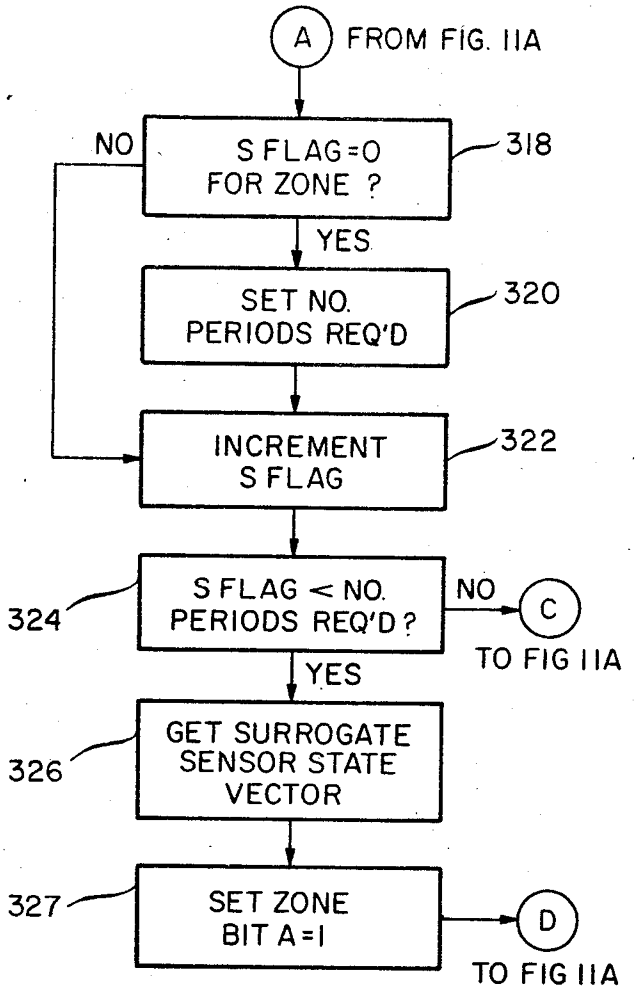

The stochastic analysis module is outlined in FIG. 11 and is accessed by interrupt handler, FIG. 9. The number of zones are determined 286, and each zone is looped through 288. The weighted sum variable "wtdsum" is initialized to zero 290, and the history table is looped through 292. The weighted event count is determined for each period 294 and added to the weighted sum "wtdsum" value 296 until all periods have been processed 298. The threshold value of events necessary to constitute an abnormality in that zone ("S-Flag") is determined 300 and compared with the current zone count of events 302. If the zone count is less than the threshold quantity of events, the "S-Flag" variable, number of periods, and new threshold values are reset 304, 306 and 308 respectively, and stored 310. Each zone is processed in a similar manner 288 et. seq., until the last zone is processed, as determined at 312. After all zones have been processed, the event table pointer is incremented 314, a new time is set on permanent queue 316 and subsequent items in the permanent queue are processed (see FIG. 9, 210).

If at point 302, the current event count for a particular zone exceeds its associated threshold, the "S-Flag" value for that zone is tested 318. If the "S-Flag" value is zero, the number of periods required is set 320, and the "S-Flag" value is incremented 322. If the "S-Flag" value for that zone is not equal to zero 318, it is incremented 322.

The "S-Flag" value is then compared to the number of events required 324, and if it is equal to or exceeds the required threshold, "S-Flag" and the number of periods, and threshold value are stored 310. If, at point 324, the "S-Flag" value is less than the quantity of events required, the surrogate sensor state vector is retrieved 326, and appropriate zone designation is set equal to one 327. "S-Flag", the number of events and new thresholds are then reset 304, 306, and 308, respectively, and stored 310. Each zone is processed in the same manner.

Figure 12A:
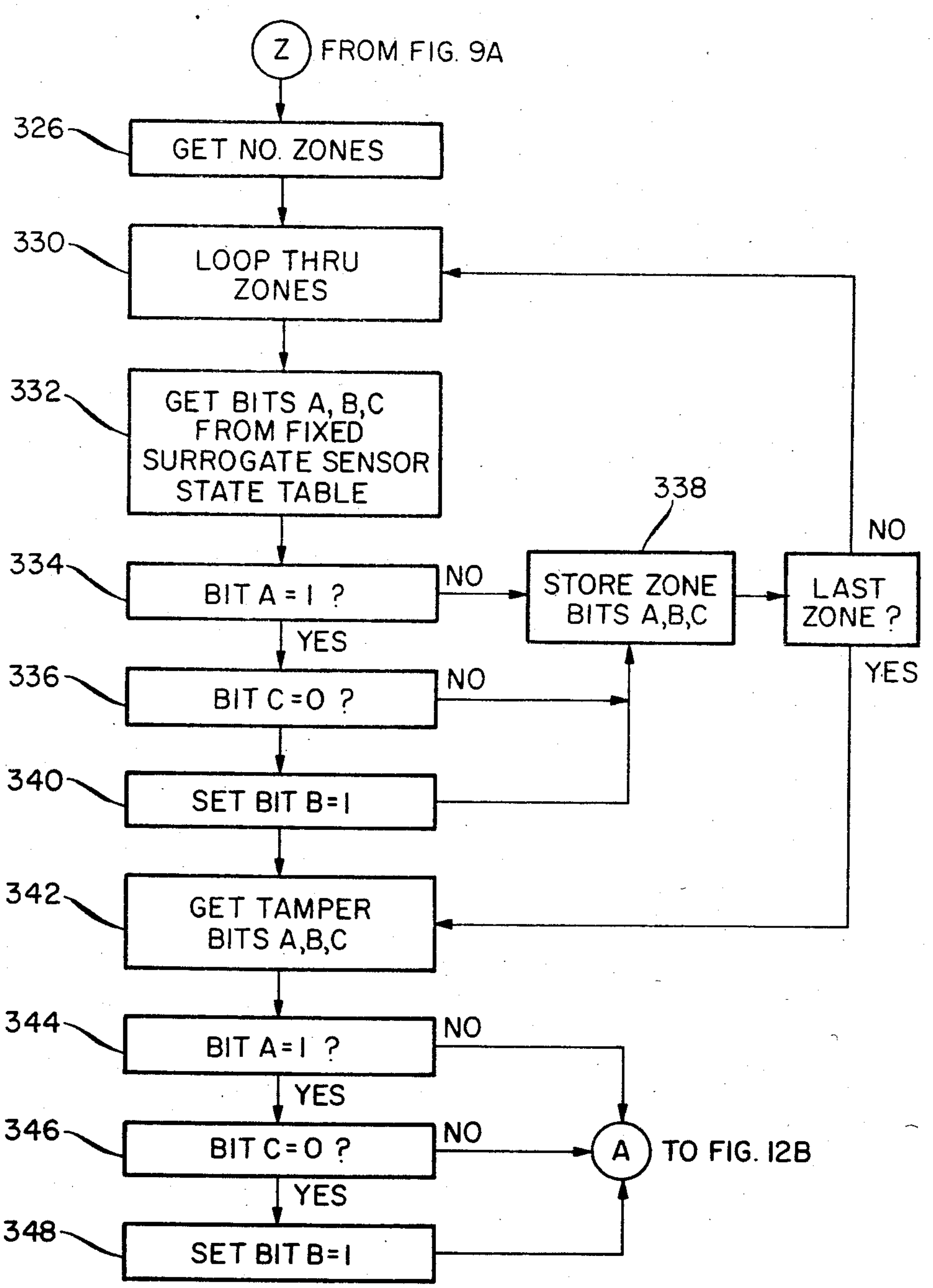
FIG. 12 (FIGS. 12A–12C) is a detailed diagrammatic flow chart of one manner of implementing the permanent queue processor function depicted in FIG. 4.
Figure 12B:
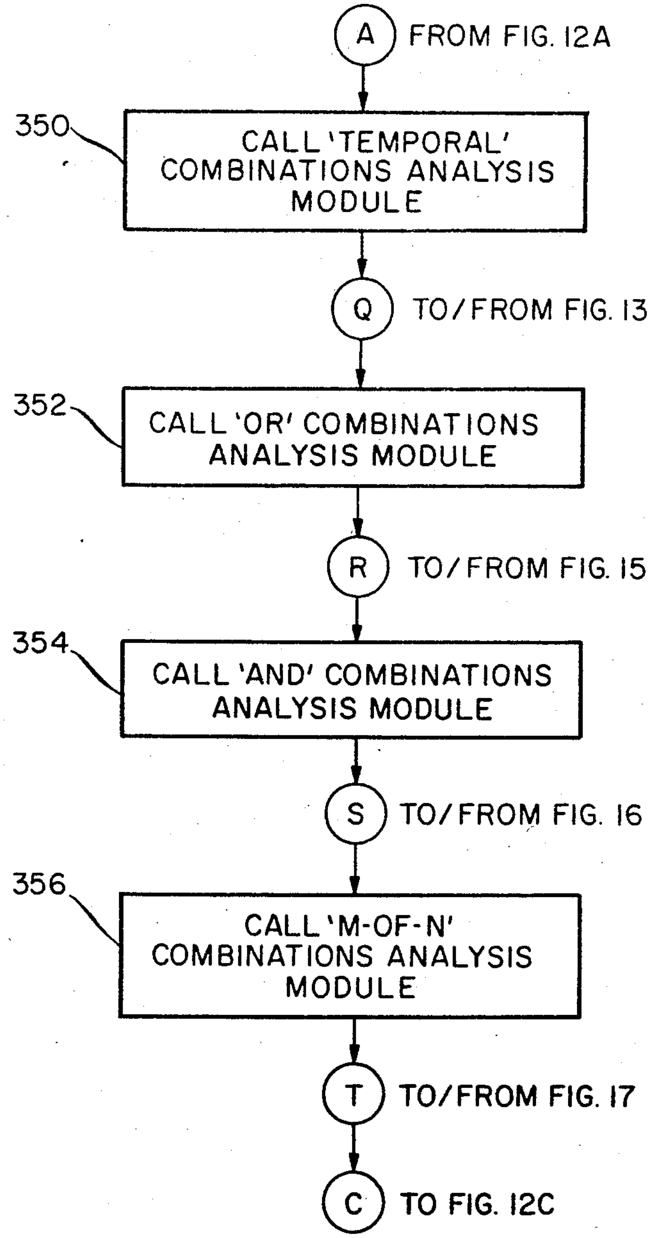
Figure 12C:
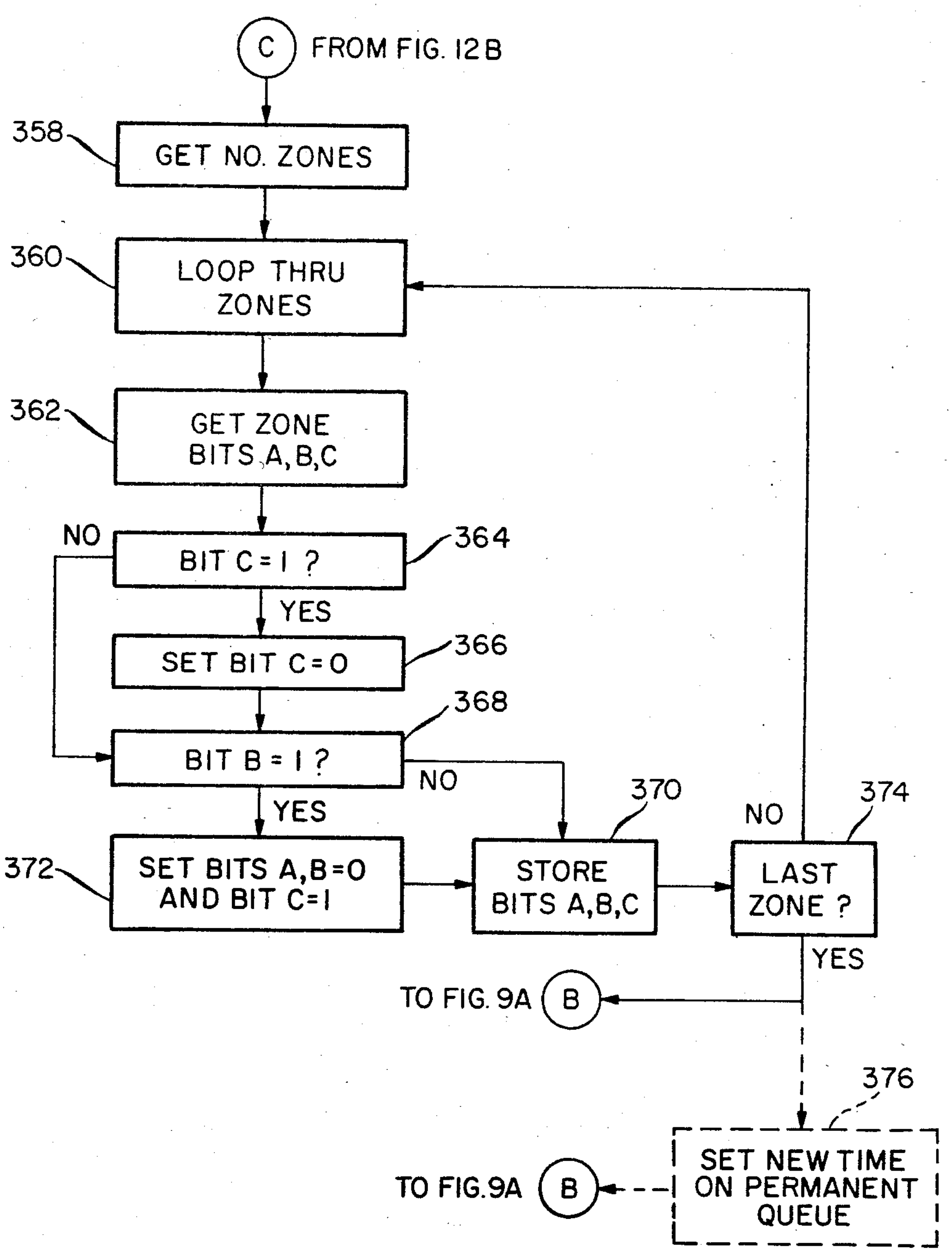

The permanent queue processor is shown in FIG. 12 in which the number of zones is determined 328, and each zone is looped through 330. Zone designation A, B, and C are retreived from the fixed surrogate sensor table 332. Zone designation A, B, and C are then stored 338. If zone designation A equals one 334, and zone designation C equals zero 336, zone designation B is set equal to one 338. If either zone designation A does not equal one or zone designation C does not equal zero, zone designation A, B, and C are stored 338. The A, B, and C designations for each zone are retrieved and set in the same manner. When the last zone is processed, as determined by 340, tamper designations A, B, and C are retrieved 342. If A is equal to one 344, and C is equal to zero 346, B is set equal to one 348. If either A is not equal to one 344, or C is not equal to zero 346, or after B is set equal to one 348, the temporal combinations analysis module is retrieved 350 (see FIG. 14). After the temporal combinations analysis module is processed, the disjunctive combinations ("or" combinations) analysis module is called 352 (see FIG. 15). After the disjunctive combinations analysis module is process, the conjunctive combinations ("and" combinations) analysis module, and the threshold quantity combnations ("M" out of "N" combinations) analysis module are each processed sequentially, 354 and 356, respectively.

After each of the four analysis modules are processed, the quantity of zones is determined 358 and each zone is looped through 360. Zone designations A, B, and C are retrieved 362 and if C is equal to one 364, it is reset equal to zero 366. If C does not equal one, B is tested 368. If B is not equal to one, A, B, and C are stored 370. If B is equal to one 368, A and B are set to zero and C is set equal to one 372. A, B, and C are then stored 370. Each zone is processed in the same manner 374 and 360, et seq.

Figure 13A:
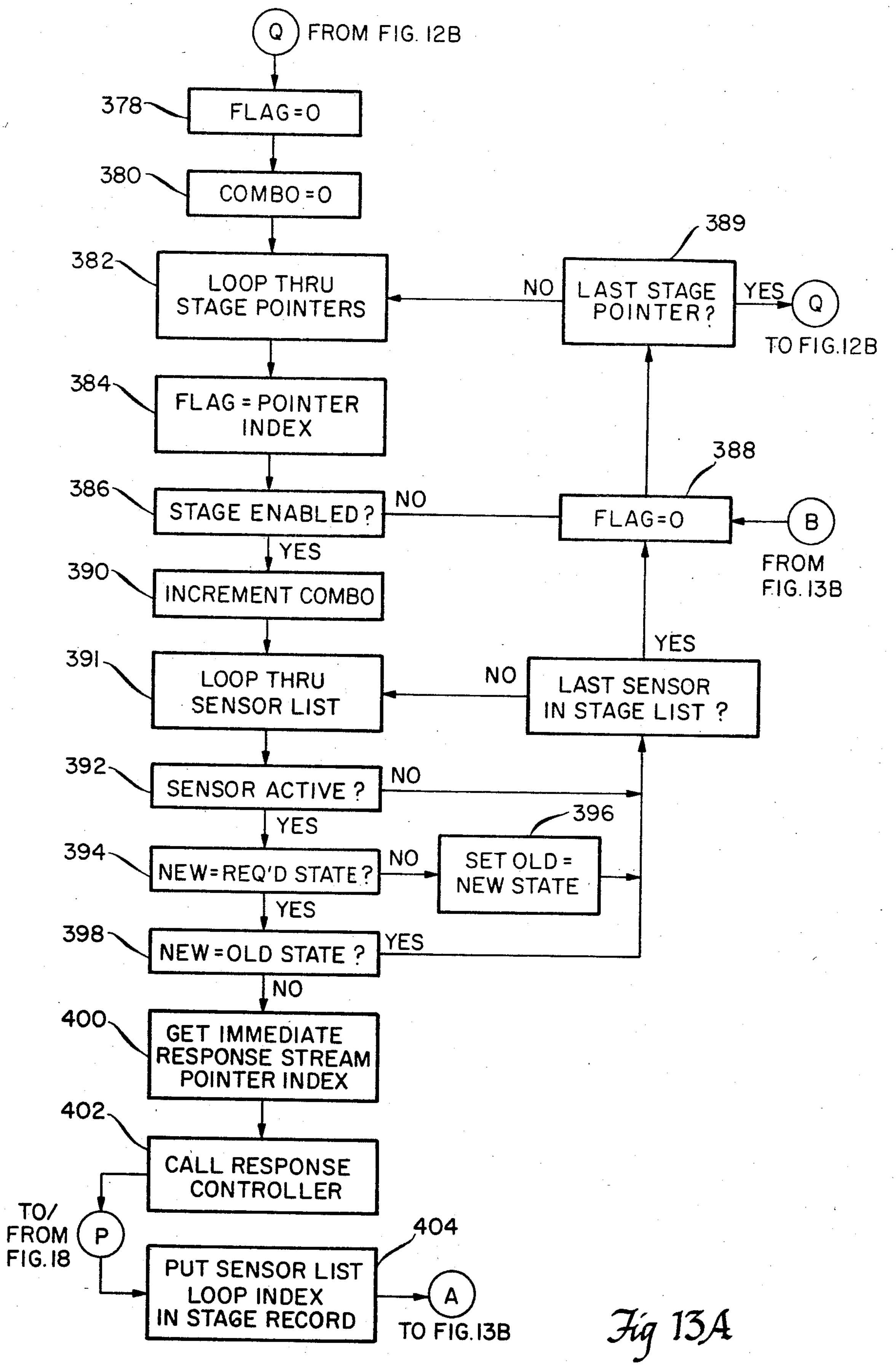
FIG. 13 (FIGS. 13A–13B) is a detailed diagrammatic flow chart of one manner of implementing the temporal combinations analysis function depicted in FIG. 4.
Figure 13B:
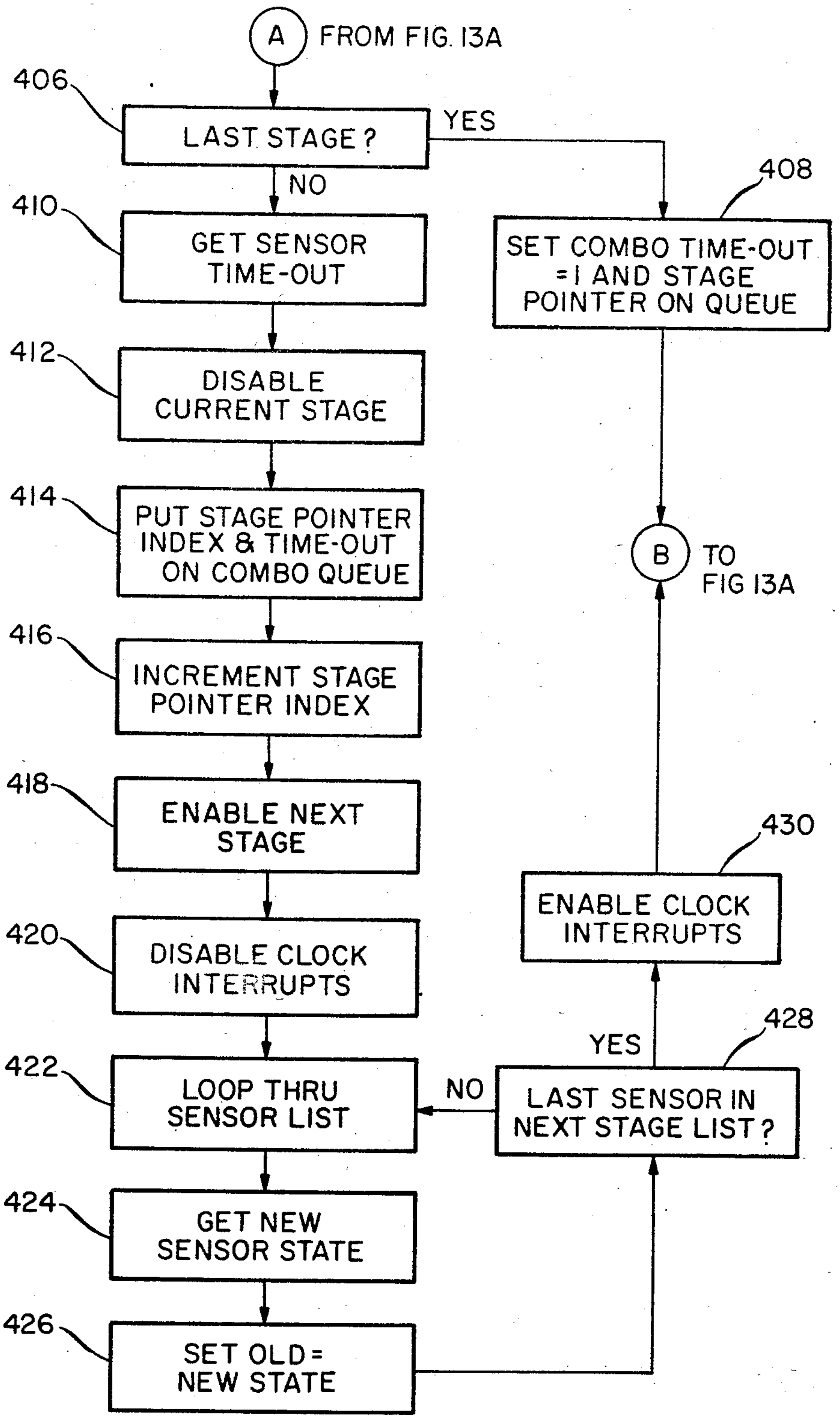
Figure 14A:
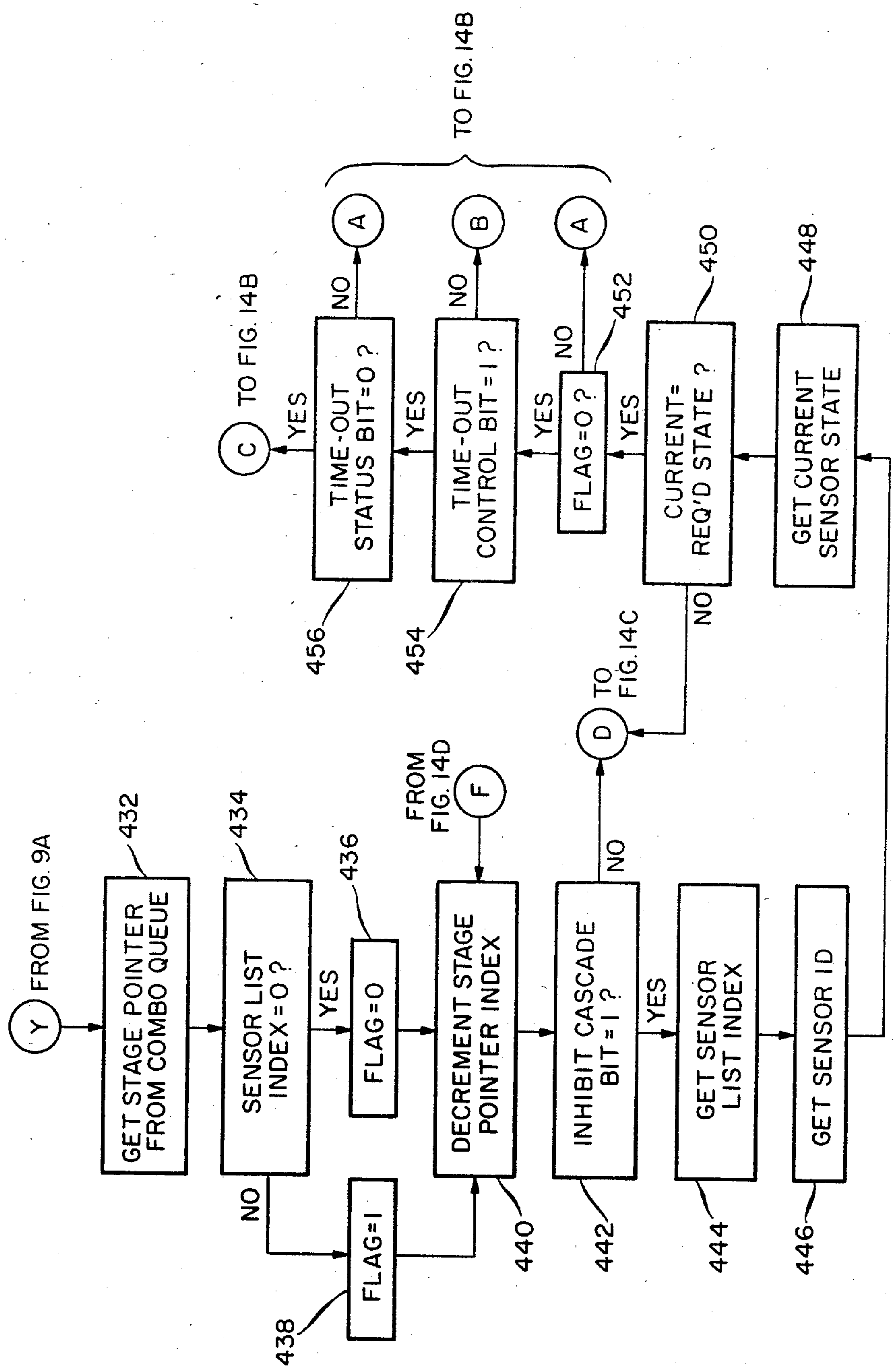
FIG. 14 (FIGS. 14A–14D) is a detailed diagrammatic flow chart of one manner of implementing the temporal combinations queue processor function depicted in FIG. 4.
Figure 14B:
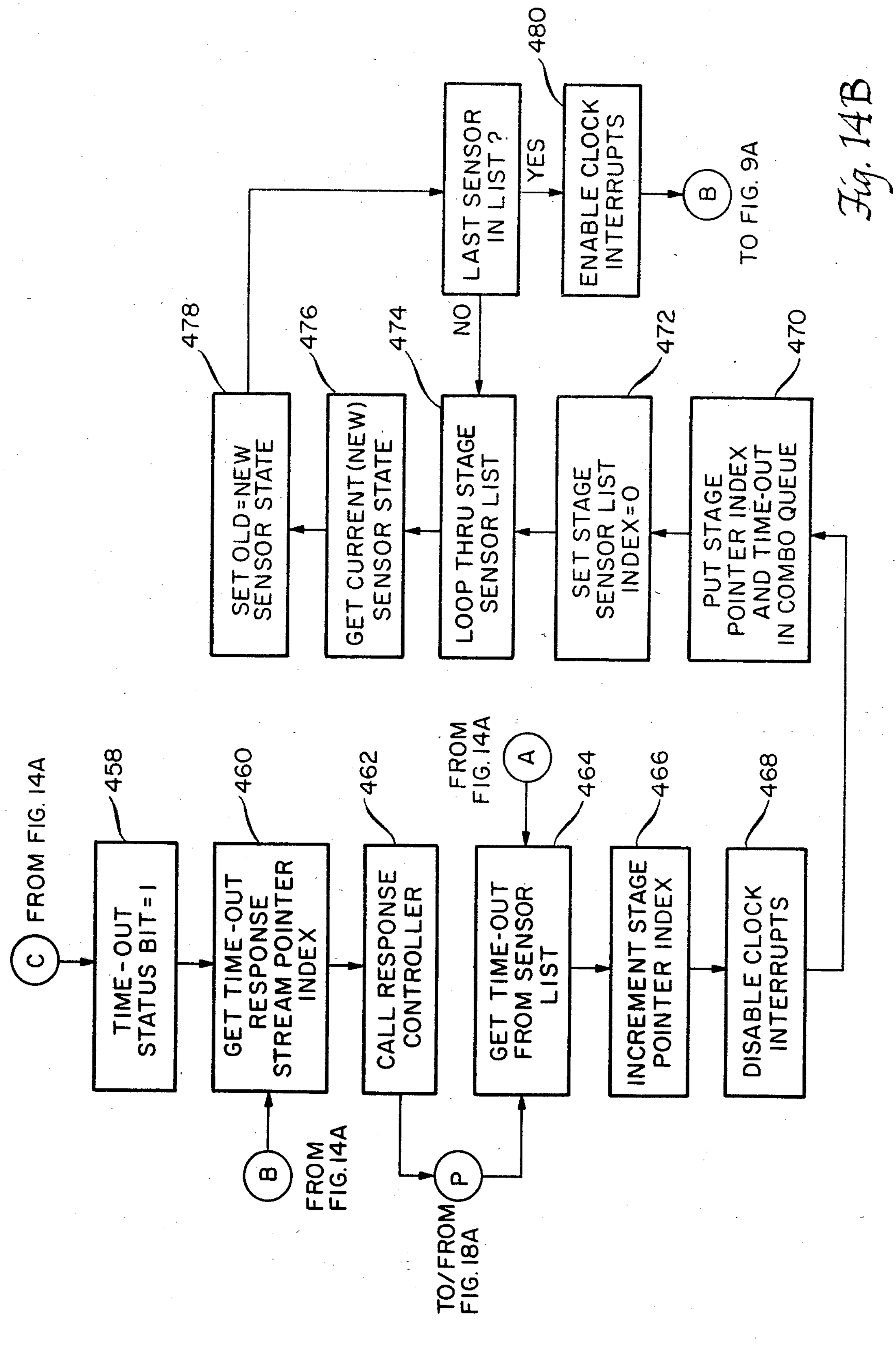
Figure 14C:
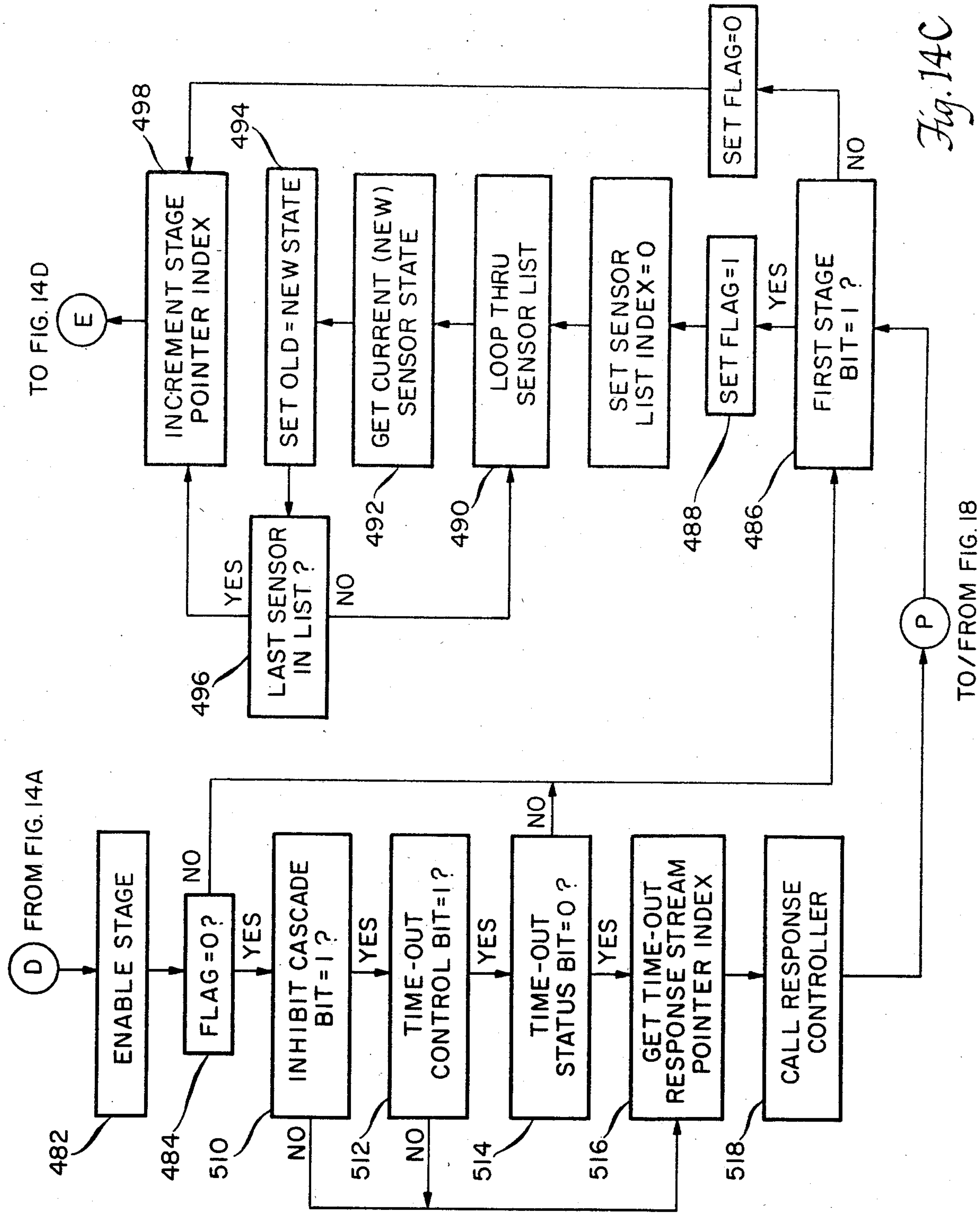
Figure 14D:
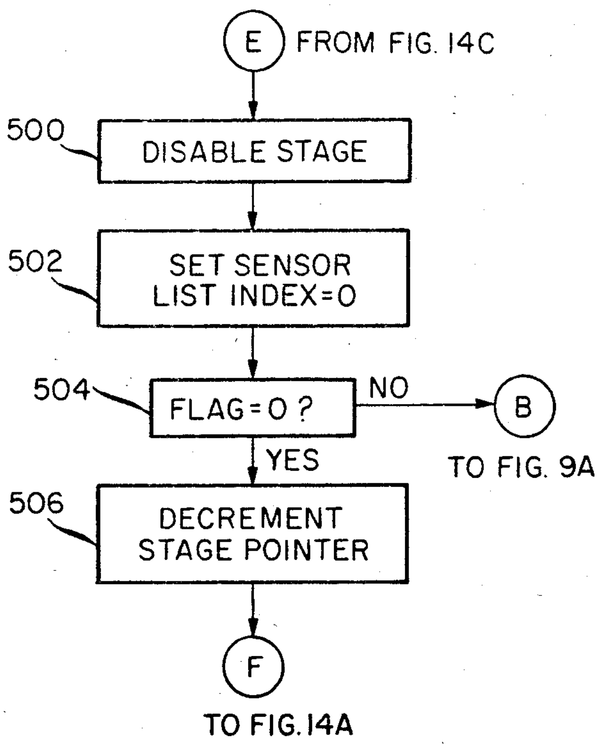

In the temporal combinations analysis module shown in FIG. 13, the "Flag" and "Combo" variables are set to zero 378 and 380 respectively. Stage pointers are looped through 382 and the "Flag" variable is set equal to the pointer index 384. The system then determines whether the particular stage is enabled 386. If the particular stage is not enabled, the "Flag" variable is set equal to zero 388. Each stage will be procesed in the same manner 382 et. seq. When the last stage is processed, as determined by 389, the permanent queue processor accesses the disjunctive combinations ("or" combinations) analysis module (see 352, FIG. 12).

If the stage was enabled at point 386, the "combo" variable is incremented 390. The sensor list is looped through 391 to determine which, if any, sensors are active 392. As each sensor is checked, the current sensor states of active sensors are compared to the required sensor state 394. If the current sensor state is not equal to the required sensor state, the old sensor state is reset to reflect the most recent sensor polling 396, and the next sensor in the stage is processed. Each sensor in the state is processed in the same manner. If the current sensor state is equal to the required sensor state at point 394, the current sensor state is compared to the prior sensor state 398 and if they are equal, the next sensor will be checked. If the new and old sensor states are not equal 394, the immediate response stream pointer index is retrieved 400, and the response controller is called 402, (see FIG. 18)

After the response controller handles the appropriate response sequence, the sensor list loop index is placed in the stage record 404. The stage is checked 406 and if it is the last stage 406, the combination time out value is set to one and stage pointer is set on queue 408, the "Flag" variable is reset to zero 388 and the next stage is processed 389 and 382, et. seq.

If the next stage is not the last stage in a combination 406, the sensor time-out is retrieved 410, and the current stage is disabled 412. The stage pointer index and time-out is placed on the combinations queue 414. The stage pointer index is then incremented 416 and the next stage is enabled 418. The clock interrupt are then disabled 420 and the sensor list is looped through 422. The current sensor state is retrieved 424 and the old sensor state is reset to reflect the most recent sensor polling state 426. Each sensor state is reset 422–426 in the same manner, and when the last sensor state is reset, as determined at point 428, the clock interrupts are re-enabled 430, the "Flag" variable is reset to zero 388 and the next stage is processed 389 and 382, et. seq.

The temporal combinations queue processor outlined in FIG. 14 is accessed by the interrupt handler (see FIG. 9). The stage poiner is retrieved 432 from the combination queue and if the sensor list index is equal to zero 434, the "Flag" variable is set to equal zero 436. If the sensor list index is not equal to zero 434, the "Flag" variable is set to equal one 438. The stage pointer index is then decremented 440 and the inhibit cascade designator is checked 442. If the inhibit cascade designator is equal to one 442, the sensor list index 444, sensor identification 446, and current sensor state 448 are retrieved. If the current sensor state is equal to the required sensor state 450, the "Flag" variable is tested 452 and if equal to zero, the time-out control indicator is tested 454. If the time-out control indicator is equal to one and the time-out status indicator is equal to zero 456, the time-out status indicator will be reset to equal one 458. The time-out response streams pointer index is retrieved 460, and the response controller is called 462 (see FIG. 18). Upon completion of the response controller function, the time-out value is retrieved from the sensor list 464, and the stage pointer index is incremented 466. The clock interrupts are disabled 468, the stage pointer index and time-out value are placed in the combination queue 470 and the stage sensor list index is set equal to zero 472.

Each of the sensors within the list are then looped through 474, and their prior polled state 478 set equal to the more recent polled state 476. When the last sensor state has been updated, the clock interrupts are reenabled 480, and the interrupt handler module resumes conventional processing (see FIG. 9).

If, at point 456, the time-out status indicator is not equal to zero, the system proceeds processing from the retrieval of the time-out from the sensor list 464. If, at point 454, the time out control indicator is not equal to one, the interrupt handler module resumes conventional processing (see FIG. 9). If, at point 452, the "Flag" variable is not equal to zero, the system proceeds processing from the retrieval of the time-out from the sensor list 464. If, at points 442 or 450 respectively, the inhibit cascade designator is not equal to one, or the current sensor state is not equal to the required sensor state, the stage will be enabled 482. If the "Flag" variable is not equal to zero 484, the stage status will be tested 486. If it is inactive to zero, the "Flag" variable will be set to equal one 488, and the sensor list index will be looped through if indicated at 490. The prior sensor states are reset 494 to reflect the current sensor states which have been retrieved 492. Each sensor in the list is looped through 490, et. seq., until the last 496 at which time the stage pointer index is incremented 498, and that stage disabled 500, and the sensor list index set to equal zero 502. If the "Flag" variable is not equal to zero 504, the interrupt handler module loops through the remaining items in the permanent queue (see 210, FIG. 9). If the "Flag" variable is equal to zero 504, the stage pointer is decremented 506 as well as the stage pointer index 440. The remaining stages in the index are then processed in the same manner 442, et. seq.

If, at point 486, the stage status is active, the "Flag" variable is set equal to zero 508 and the stges are decremented and processed as described above 498, 440, et. seq.

Figure 18A:
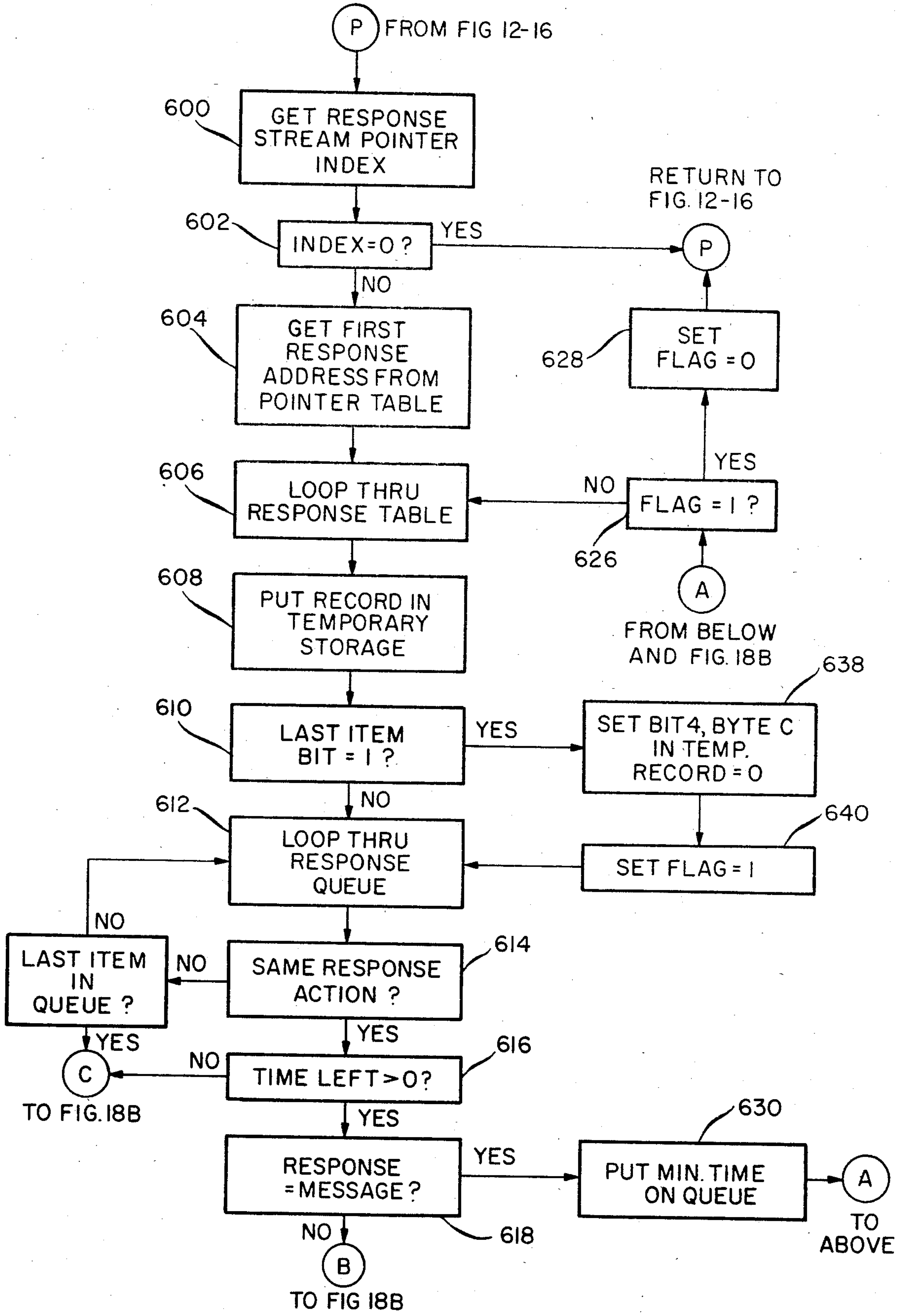
FIG. 18 (FIGS. 18A–18B) is a detailed diagrammatic flow chart of one manner of implementing the response controller function depicted in FIG. 4.
Figure 18B:
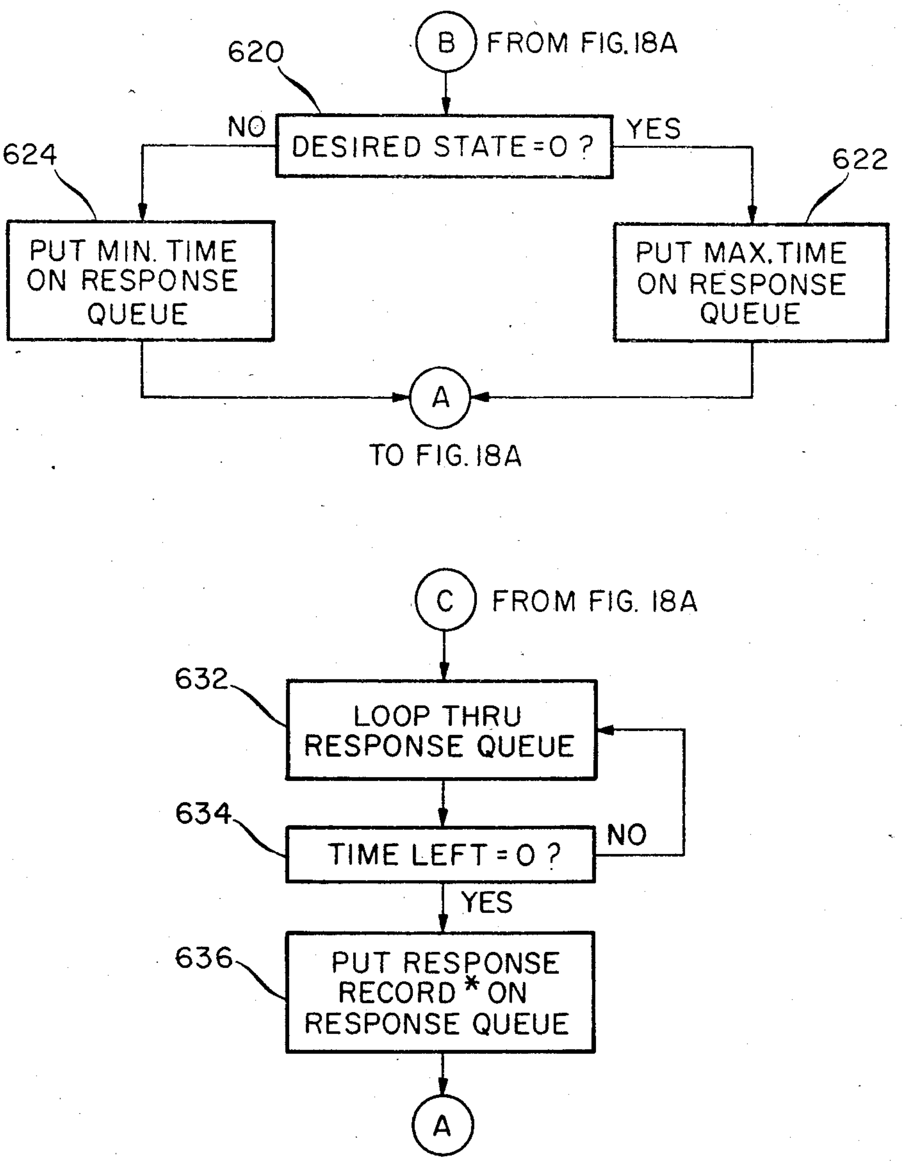

If, at point 484, the "Flag" variable is equal to zero, the inhibit cascade designator is equal to one 510, the time-out control indicator is equal to one 512, and the time-out status indicator is equal to zero 514 the time-out response stream pointer index will be retrieved 516, and the response controller will be activated accordingly 518 (see FIG. 18). After the response controller function is completed the system continues as described from the testing of the stage status 486.

If the inhibit cascade designator is not equal to one 510, or the time-out control indicator is not equal to one 512, the time-out response stream pointer index will be retrieved 516 without testing the subsequent indicators 512 and 514, respectively. If the time-out status indicator is not equal to zero 514, the system proceeds to process from the stage status test 486, accordingly.

Figure 15:
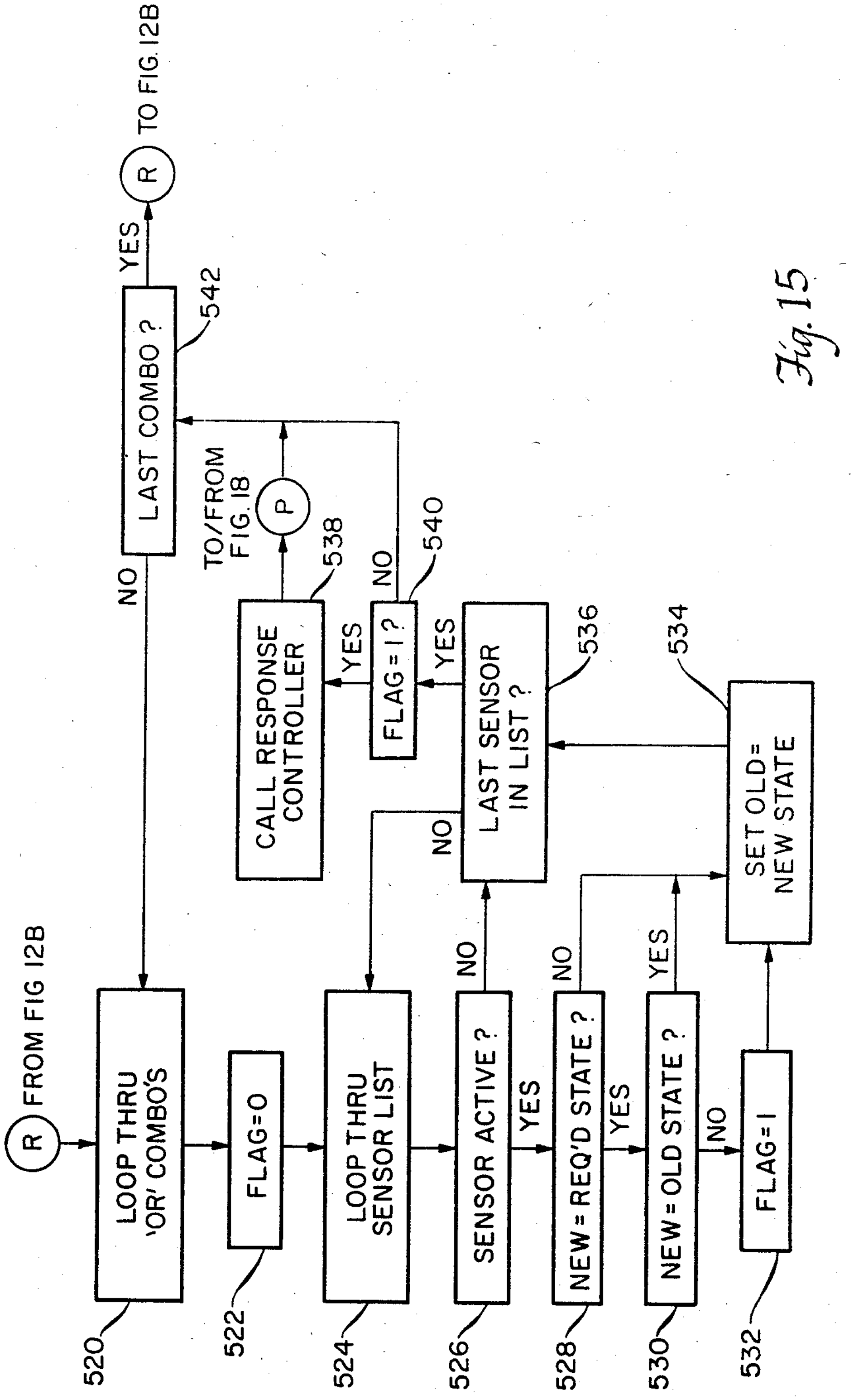
FIG. 15 is a detailed diagrammatic flow chart of one manner of implementing the disjunctive combinations analysis function depicted in FIG. 4.

The disjunctive combination ("or" combinations) analysis function is shown in FIG. 15. The "or" combinations are looped through 520 and the "Flag" variable is reset equal to zero 522. Each of the sensors is then looped through 524 to determine which are active 526, and of those which staisfy the required states for this particular combination 528. The new sensor state of those sensors satisfying the required states is then compared with the old sensor state 530 to insure that a change of sensor state has occurred since the preceeding sensor poll. If at least one sensor in the combination, in addition to satisfying the required sensor state, has experienced a change of state since the last sensor poll, the "Flag" variable will be set equal to one 532 indicating an appropriate response is necessary, and the sensor history status will be changed to reflect the most recent polling 534.

If either the required state has not been satisfied by any sensors within the combination 530, or those satisfying the required state have not experienced a sensor status change since the preceeding sensor poll, the sensor history status will be reset 534, but a reponse designation will not occur at 32.

After all of the sensors have been checked, as indicated by 536, the response controller is summoned 538 if the "Flag" variable indicates that response is necessary 540. If no response is necessary or after an appropriate response has been dispatched, the system tests the next combination 520, et. seq. If all combinations have been processed 542, the permanent queue processor processes its subsequent subroutines (see 354, FIG. 12).

Figure 16:
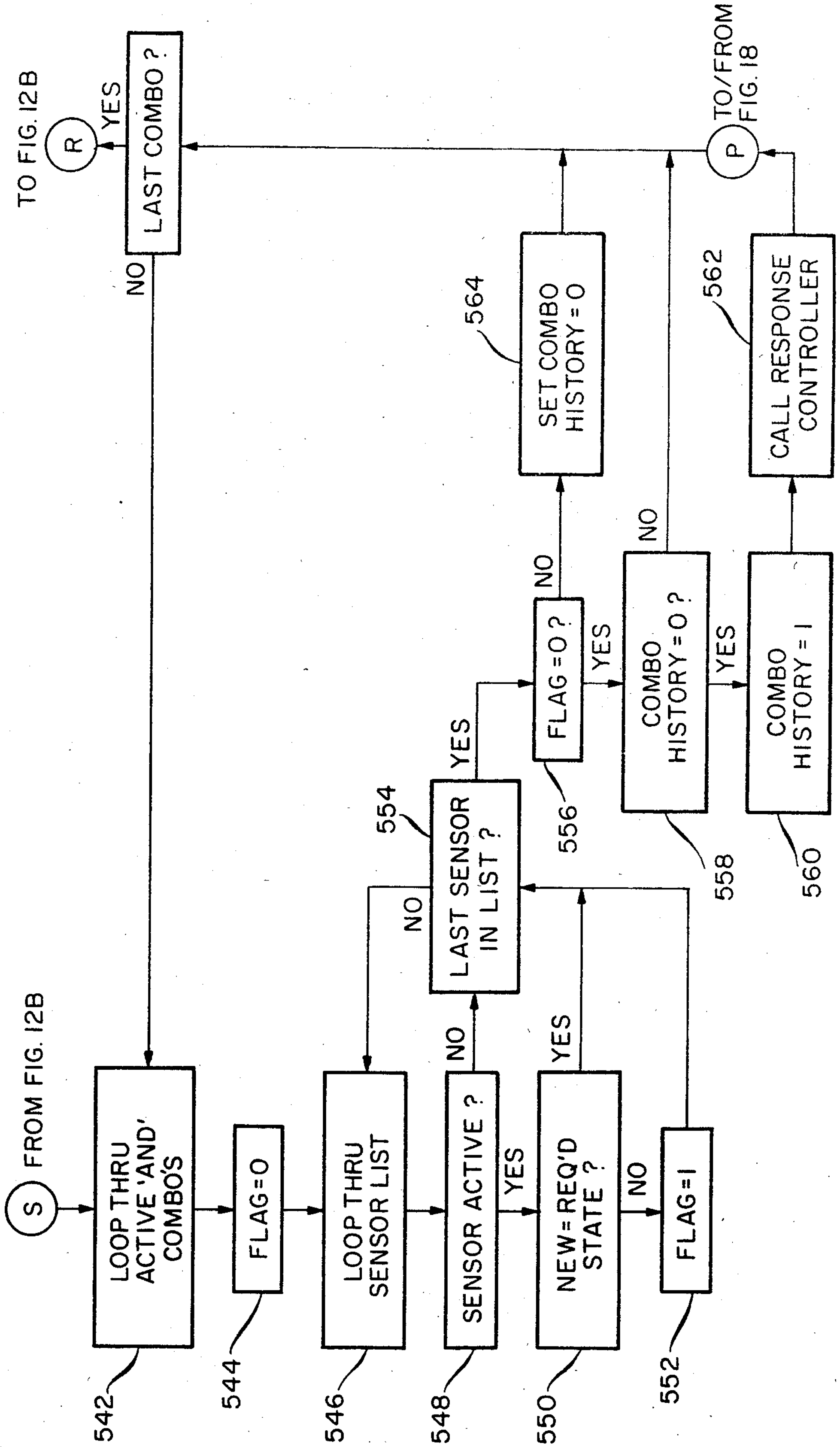
FIG. 16 is a detailed diagrammatic flow chart of one manner of implementing the conjunctive combinations analysis function depicted in FIG. 4.

The conjunctive combinations ("and" combinations) analysis routine is shown in FIG. 16. The permanent queue processor accesses the conjunctive combinations analysis routine (see 354, FIG. 12). The active "and" combinations are looped through 542, and the "Flag" variable is set equal to zero 544. Each of the sensors in that particular combination are then looped through 546 to determine which sensors are active 548 and of those active sensors, which have current sensor states equal to the required sensor states 550. If the current sensor state is not equal to the required sensor state, the "Flag" variable is set equal to one 552.

After each sensor within the combination has been processed in this manner, the combination history will be set equal to zero 564 unless the combination is true, as indicated by "Flag" variable equal to zero 556. If the combination is true, it is compared with the combination status from the preceeding poll 558 and if different, the combination history is reset to reflect its new status 560 and the response controller is summoned 562 to process the appropriate response (see FIG. 18). After the response controller processes the appropriate response 562, or if the combination status does not differ from the preceding polled status 558, or if the combination is not true on this particular poll 556, the next combination is processed as described above 542, et. seq. This process is repeated until the last combination has been processed, at which time the permanent queue processor will access the threshold quantity combinations analysis module (see 354, FIG. 12).

Figure 17:
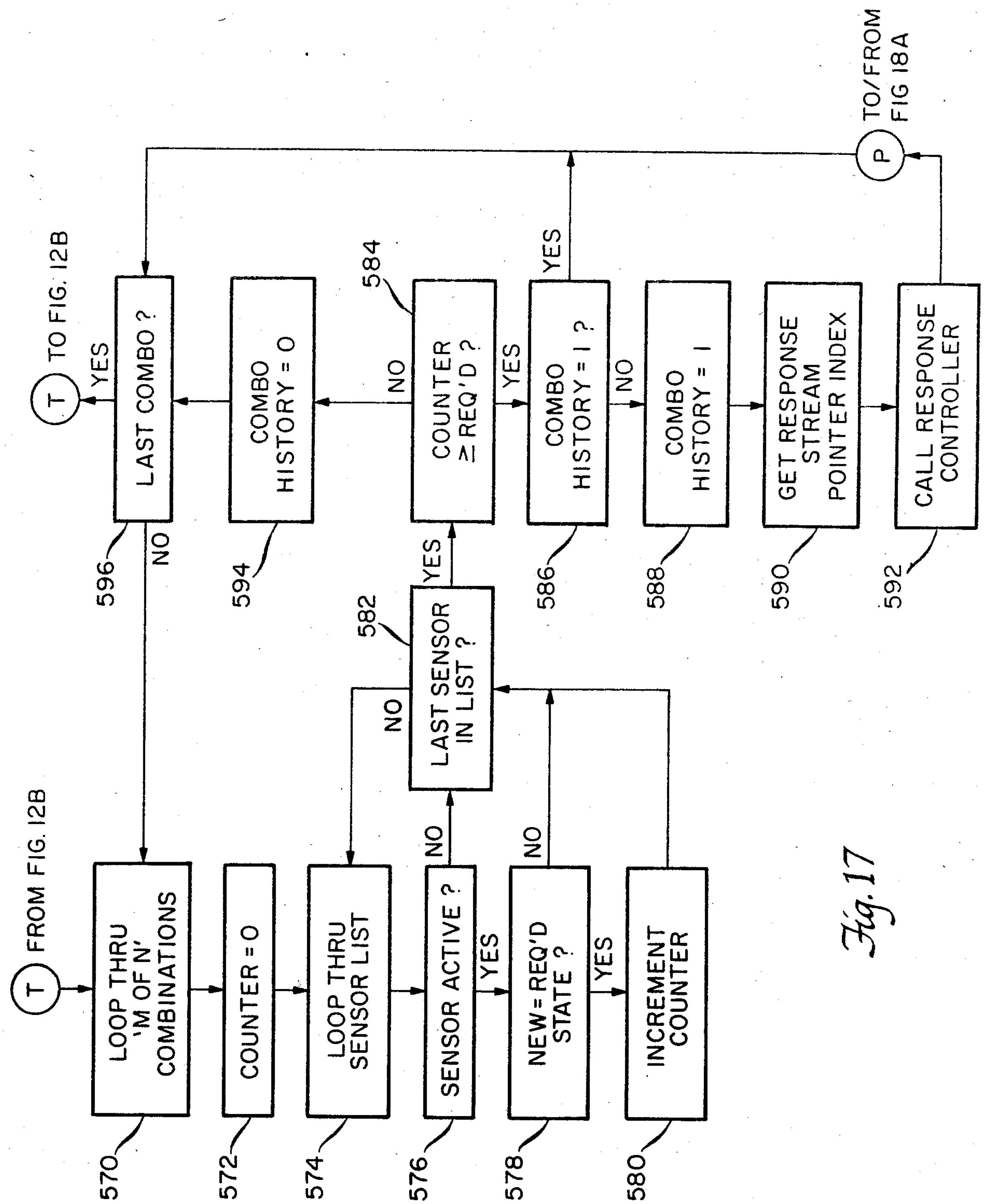
FIG. 17 is a detailed diagrammatic flow chart of one manner of implementing the threshold quantity combinations ("M out of N" combinations) analysis function depicted in FIG. 4.

In the threshold quantity combinations ("M" out of"N" combinations) analysis module, FIG. 17, each of the combinations is looped through 570, and the "counter" variable is initialized to zero 572. Each of the sensors within each combination are looped through 574 in order to determine which are active 576, and of those active sensors, which satisfy the sensor states required by the combination 578. The "counter" variable is incremented 580 for each active sensor which satisfies the required sensor state for that particular combination.

When the last sensor for each combination has been tested 582, the "counter" variable value is compared to the received threshold quantity 584 and if it equals or exceeds the required threshold quantity, the combination history status is compared to the current satisfied combination (true) status 586. If a change has occurred in the combination status since the previous polling routine, the combination history status is reset to reflect this change of state 588, the response stream pointer index is retrieved 590 and the response controller is called 592 to process the appropriate response (see FIG. 18).

If, at point 586, the combination history status is identical to the current status (i.e. true), no response action will occur and the next combination will be processed. If, at point 584, the "counter" variable, indicating the number of active sensors is less than the threshold quantity necessry for response action, the combination history will be set to zero 594 to reflect the false status of the combination, and the next combination will be processed 596 and 570, et. seq.

The response controller module, described in FIG. 18 is called whenever there is a designation of a necessary response action. The response stream pointer index is retrieved 600, and the index variable is tested 602. If it is not equal to zero, the first response address is retrieved 604 from the pointer table. The record is placed in temporary storage 608 and the last item indicator is tested 610. If it is equal to one, the response queue is looped through 612, and it is determined whether the designated response action is the same 614. If so, the time remaining is checked 616 and if there is still time remaining, an inquiry is made as to whether the response is to be a message 618. If the response is a message, the lesser of the time on the queue or the time in the temporary record is placed on the response queue and the next response item retrieved 626. If the input is negativeive, the desired state is determined 620. If the desired state is zero, (turn device off), the maximum time is placed on the response queue 622. If the desired state is not zero 620, the minimum time is placed on the response queue 624. After the appropriate time has been placed on the response queue, if the "Flag" variable is equal to one 626, it will be reset to equal zero 628 and the system returns algorithm to the detection following the one that called the response controller. If, at point 626, the "Flag" variable is not equal to one, the system will resume its loop through the response table 606, et. seq.

If at point 616 there is no time remaining the response queue is looped through 632 until there is no time remaining on the queue 634 at which point, the temporary response record is placed on the response queue 636, the "Flag" variable is then tested 626 and processing resumes from that point.

If the response action is not the same as the one being tested in the loop 614, subsequent actions will be tested until either one is the same action, or until the queue list is exhausted.

Figure 19A:
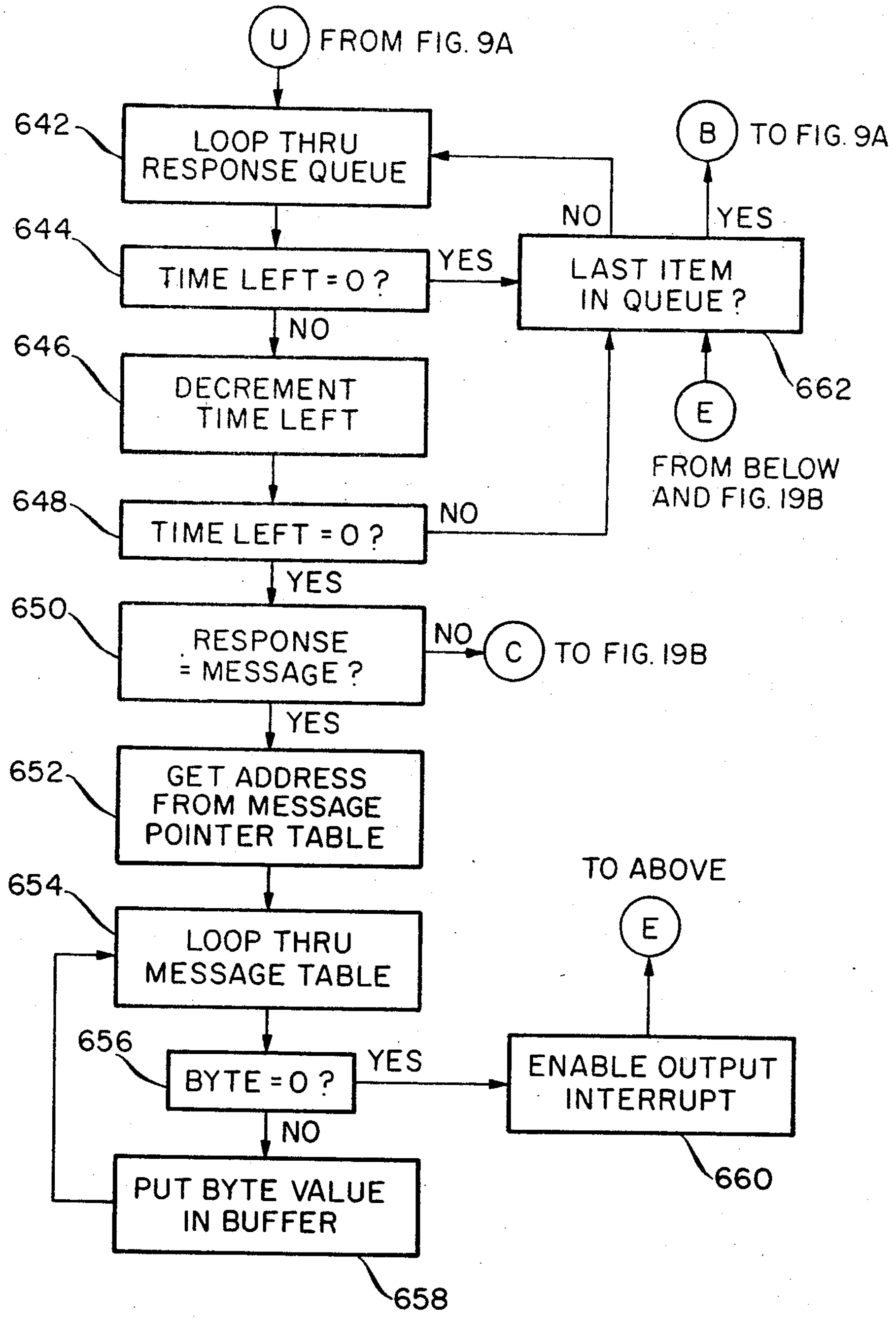
FIG. 19 (FIGS. 19A–19B) is a detailed diagrammatic flow chart of one manner of implementing the response queue processor function depicted in FIG. 4.
Figure 19B:
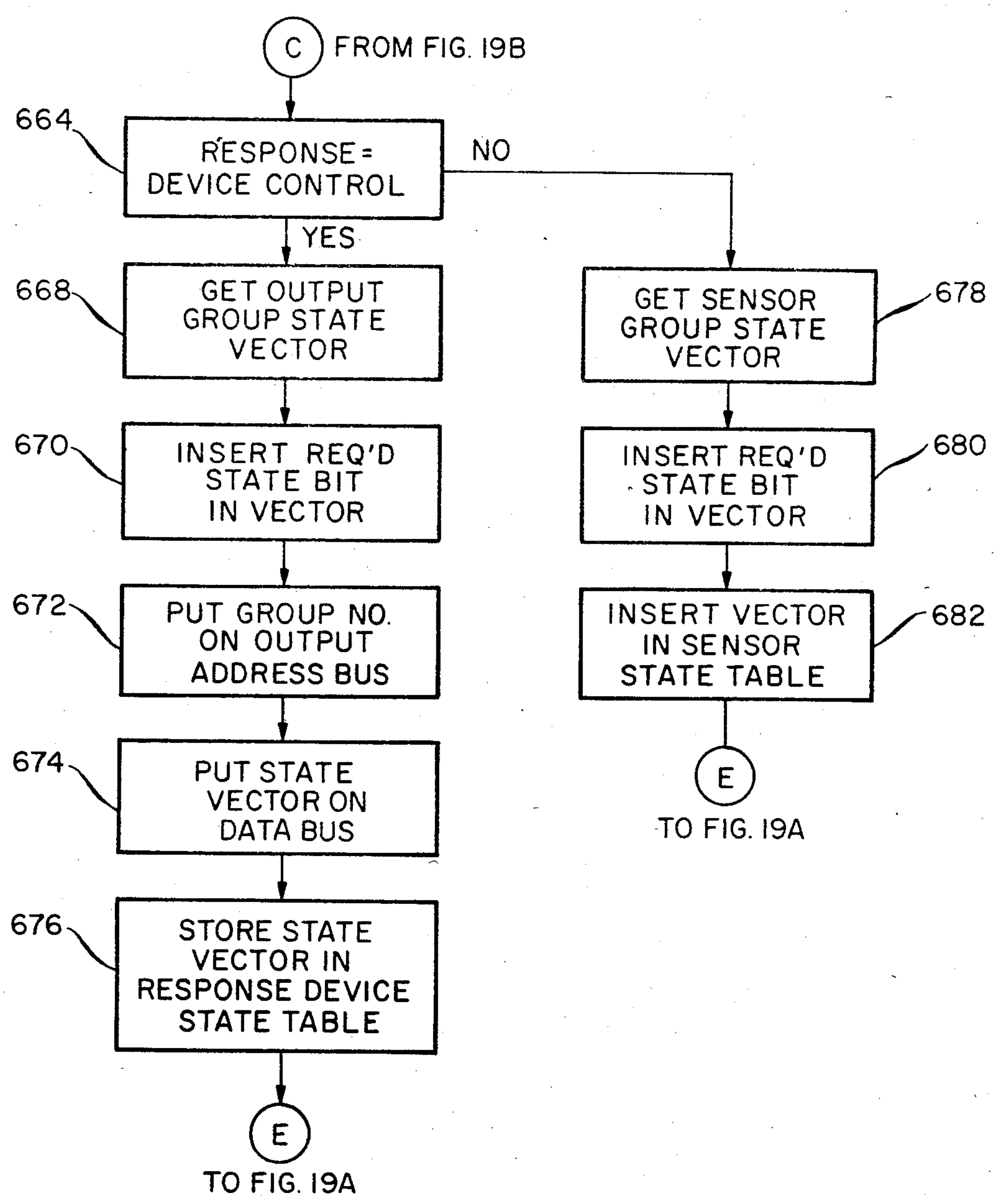

The response queue processor module is outlined in FIG. 19 in which the response queue is looped thorugh 642 and the remaining time is checked 644. If there is time remaining, it is decremented 646 and checked again 648. If there is now no time remaining, the response is checked 650 and if it is to be a message, it is retrieved 652 using the message pointer table. The message in the table is looped via 654 until a character (bytes) having an indicator equal to zero is found 656 at which time the output interrupt is enabled 660 and the next item in the response queue is processed 662. If, at point 656, the indicator is not equal to zero, its value is placed in a buffer 658 and the next character is tested 654.

If, at point 644 or 648, there is time remaining, the next item in the response queue will be processed 662 and 642. If, at point 650, the response is not to be a message, the system determines whether it is to be a device control 664. If so, the output group state vector is retrieved 668 and the required state designator is inserted in the vector 670. The group number is then placed on the output address bus 672 and the state vector is placed on the data bus 674. The state vector is then stored in the response device state table 676 and the next item in the response queue is processed 642.

If the response to be precessed is not a device control 664, the sensor group state vector is retrieved 678, the required state bit inserted in the vector 680, and the vector inserted in the state table 682. The next item in the response queue is then processed 642.

The ability to set a "sensor" state via the response processor provides a number of important additional capabilities. It allows a "primitive" detection combination ("or", "and" or "M-out-of-N") to be represented by a single "surrogate" sensor state which may be referenced and evaluated in any other detection combination (except the stochastic analysis). This feature thus allows flexible Boolean logic to be utilized to enhance detection capability while also reducing the false alarm rate. Furthermore, by appropriate usage of the "surrogate sensor" capability, a hierarchical specification of complete Boolean logic can be constructed. Since any of the "surrogate sensor" states can be included in identical fashion in any of the detection combinations, this feature allows complex Boolean logic to be included in the "temporal" combinations, or, conversely, for the operation of a temporal combination stage to be included in another detection combination. Finally, the duration of the "surrogate sensor" state can be controlled by the response processor, because a separate command to change its state to "on" and another command to to turn it off can be issued in a single response action stream. Thus, inclusion of the sensor state response command is a powerful feature providing completely flexible Boolean logic which is time sensitive.

Other embodiments will occur to those skilled in the art and are within the following claims.

What is claimed is:

1. An anomaly detection system comprising:

a plurality of sensor means for providing an output representative of the current operational environment of the subject premises;

means, responsive to said output, for translating said output to a signal;

control means for defining the normal operational parameters of said subject premises by specifying expected normal states of and a predetermined combination of required detection states for said sensor means;

stochastic means, responsive to said output representative of the current operational environment, for periodically adjusting said definition of said normal operational parameters of said subject premises to accommodate routine changes in the current operational environment;

processor means for comparing said output representative of said current operational environment with said updated definition of said normal operational parameters of said subject premises, and for detecting a deviation therebetween;

output means, responsive to said means for comparing and detecting, for providing an output representative of said detected deviation between said output representative of said current operational environment and said normal operation parameters of said subject premises; and a plurality of response devices, responsive to said output means, for providing a specific response sequence representative of the nature and location of said detected deviation.

2. The anomaly detected system of claim 1 which includes a plurality of interdependent detection methods.

3. The anomaly detection system of claim 2 in which said interdependent detection methods are complementarily related such that attempts to defeat a specific said method of detection will increase the probability of detection by an alternate said detection methods.

4. The anomaly detection system of claim 3 in which said normal operating parameters include stochastic algorithms.

5. The anomaly detection system of claim 4 in which one of said interdependent detection methods employs said stochastic algorithms.

6. The anomaly detection system of claim 1 in which said updated normal operational parameters retain sensitivity to statistically significant changes indicative of an abnormal situation.

7. The anomaly detection system of claim 1 in which said normal operational parameters are implemented by the use of software logic.

8. The anomaly detection system of claim 7 in which said normal operational parameters can be modified manually by data entry.

9. The anomaly detection system of claim 8 in which said normal operational parameters can be modified automatically in response to changes in the characteristics of the subject premises to be protected.

10. The anomaly detection system of claim 1 in which said means for comparing includes a microprocessor.

11. The anomaly detection system of claim 1 in which said sensor means includes acoustical sensor devices.

12. The anomaly detection system of claim 1 in which said response devices initiate a specific response sequence which is dependent upon said detected deviation.

13. The anomaly detection system of claim 12 in which said specific response sequence is initiated in response to specific sensor state requirements and time-state conditions.

14. The anomaly detection system of claim 13 in which said specific response sequence is dependent on said specific sensor state requirements satisfied for each said time-state condition.

15. The anomaly detection system of claim 12 in which said specific response sequence is representative of the specific said sensor means delivering the anomalous signal.

16. The anomaly detection system of claim 12 in which said specific response sequence is representative of the location of the detected anomalous condition.

17. The anomaly detection system of claim 1 in which said means for comparing and detecting employs a comparision of said output representative of the current operational environment with a predetermined combination of required sensor switch states.

18. The anomaly detection system of claim 17 in which said predetermined combination of required sensor switch states includes conjunctive combinations.

19. The anomaly detection system of claim 17 in which said predetermined combination of required sensor switch states includes disjunctive combinations.

20. The anomaly detection system of claim 17 in which said predetermined combination of required sensor switch states includes threshold quantity combinations.

21. The anomaly detection system of claim 17 in which said predetermined combination of required sensor switch states includes temporal combinations.

22. The anomaly detection system of claim 17 in which said required sensor switch states are representative of the occurence of certain events.

23. The anomaly detection system of claim 17 in which said required sensor switch states are representative of the non-occurence of certain events.

24. The anomaly detection system of claim 17 in which one of a plurality of surrogate sensors is assigned to each said predetermined combination of required sensor switch states.

25. The anomaly detection system of claim 24 in which the sensor state of each said surrogate sensor is representative of the truth status of its associated said predetermined combination of required sensor switch states.

26. The anomaly detection system of claim 24 in which a required sensor state for each said surrogate sensor may be included as one element in a different said predetermined combination of required sensor switch states.

27. The anomaly detection system of claim 24 in which said predetermined combination of required sensor switch states includes a required sensor state for one of said surrogate sensors.

28. The anomaly detection system of claim 24 in which said predetermined combination of required sensor switch states includes a plurality of required sensor states for an associated plurality of said surrogate sensors.

29. The anomaly detection system of claim 24 in which the hierchical arrangement of a plurality of said predetermined combination of required sensor switch states, each including a required sensor state for at least one of said surrogate sensors, provides complete Boolean logic capabilities.

30. An anomaly detection method comprising:

providing an output representative of the current operational environment of the subject premises;

translating said output to a signal;

defining the normal operational parameters of said subject premises by specifying an expected normal output and a predetermined combination of required detection states for the current operational environment;

adjusting said definition of said normal operational parameters of said subject premises to accommodate routine changes in the current operational environment;

comparing said output representative of said current operational environment with said updated definition of said normal operational parameters of said subject premises, and detecting a deviation therebetween;

providing an output representative of said detected deviation between said output representative of said current operational environment and said normal operation parameters of said subject premises; and providing a specific response sequence representative of the nature and location of said detected deviation.

31. The anomaly detection method of claim 30 in which said updated normal opperational parameters retain sensitivity to statistically significant changes indicative of an abnormal situation.

32. The anomaly detection method of claim 30 in which said normal operational parameters can be modified manually by data entry.

33. The anomaly detection method of claim 30 in which said normal operational parameters can be modified automatically in response to changes in the characteristics of the subject premises to be protected.

34. The anomaly detection method of claim 30 in which said response devices initiates a specific response sequence which is dependent upon said detected deviation.

35. The anomaly detection method of claim 34 in which said specific response sequence is initiated in response to specific sensor state requirements and time-stage conditions.

36. The anomaly detection method of claim 34 in which said specific response sequence is representative of the location of the detected anomalous condition.

37. The anomaly detection method of claim 30 which includes a plurality of inversely related detection modes.

* * * * *